United States Patent
Hining et al.

(10) Patent No.: US 9,273,525 B2
(45) Date of Patent: Mar. 1, 2016

(54) INTERFERENCE-FIT STOP COLLAR AND METHOD OF POSITIONING A DEVICE ON A TUBULAR

(71) Applicant: ANTELOPE OIL TOOL & MFG. CO., LLC, Mineral Wells, TX (US)

(72) Inventors: Ira Eugene Hining, Houston, TX (US); Jean Buytaert, Mineral Wells, TX (US); Eugene Edward Miller, Weatherford, TX (US)

(73) Assignee: ANTELOPE OIL TOOL & MFG. CO., Mineral Wells, TX (US)

( * ) Notice: Subject to any disclaimer, the term of this patent is extended or adjusted under 35 U.S.C. 154(b) by 141 days.

(21) Appl. No.: 14/046,320

(22) Filed: Oct. 4, 2013

(65) Prior Publication Data

US 2014/0034334 A1 Feb. 6, 2014

Related U.S. Application Data

(62) Division of application No. 12/756,177, filed on Apr. 8, 2010, now Pat. No. 8,832,906.

(60) Provisional application No. 61/287,665, filed on Dec. 17, 2009, provisional application No. 61/237,202, filed on Aug. 26, 2009, provisional application No. 61/221,716, filed on Jun. 30, 2009.

(51) Int. Cl.
*E21B 19/16* (2006.01)
*B25B 27/10* (2006.01)
(Continued)

(52) U.S. Cl.
CPC .................. *E21B 19/16* (2013.01); *B25B 27/10* (2013.01); *E21B 17/00* (2013.01); *E21B 17/006* (2013.01);
(Continued)

(58) Field of Classification Search
CPC ...... E21B 37/02; E21B 17/1085; Y10T 24/38; Y10T 24/39; B23P 11/00; B29C 37/02; B29C 39/10; B29C 65/42; B29C 66/53241; B29C 66/55; B21J 15/00; B25B 31/00; B25B 1/00
USPC .......................................................... 24/20 R
See application file for complete search history.

(56) References Cited

U.S. PATENT DOCUMENTS 1,201,706 A 10/1916 Dodge
2,368,401 A 1/1945 Baker
(Continued)

FOREIGN PATENT DOCUMENTS

EP 0088507 A1 9/1983
GB 2304753 A 3/1997
WO 2007143324 A1 12/2007

OTHER PUBLICATIONS

Final Office Action dated Mar. 13, 2014, U.S. Appl. No. 12/756,177, filed Apr. 8, 2010, pp. 1-11.
(Continued)

*Primary Examiner* — Lee D Wilson
(74) *Attorney, Agent, or Firm* — MH2 Technology Law Group, LLP

(57) ABSTRACT

A stop collar is assembled using a method including the steps of receiving a bore of a base having a set of fingers extending along an exterior of a tubular, receiving a bore of a sleeve onto the tubular adjacent the set of fingers, and receiving the sleeve onto the set of fingers in an interference-fit. In alternate embodiments, the base comprises a plurality of angularly distributed fingers and/or the base comprises a gap to permit conformance of the base to the tubular. A fingerless base may cooperate with one or more separate fingers to form a base. In an embodiment of the method, the sleeve may be thermally expanded prior to the step of receiving the sleeve onto the set of fingers. The sleeve may be heated to expand the bore prior to being received onto the set of fingers.

23 Claims, 23 Drawing Sheets

(51) Int. Cl.
 *E21B 17/00* (2006.01)
 *F16D 1/08* (2006.01)

(52) U.S. Cl.
 CPC ........... *F16D 1/0858* (2013.01); *Y10T 24/1457* (2015.01); *Y10T 29/53987* (2015.01); *Y10T 403/69* (2015.01)

(56) References Cited

U.S. PATENT DOCUMENTS

| | | | |
|---|---|---|---|
| 2,496,402 A | | 2/1950 | McVeigh et al. |
| 2,797,766 A | | 7/1957 | Hall, Sr. |
| 2,824,613 A | | 2/1958 | Baker et al. |
| 2,855,062 A | | 10/1958 | Wright et al. |
| 2,962,313 A | | 11/1960 | Conrad |
| 2,986,417 A | | 5/1961 | Baker |
| 3,040,405 A | | 6/1962 | Solum |
| 3,063,760 A | | 11/1962 | Gifford |
| 3,124,196 A | | 3/1964 | Solum |
| 3,292,708 A | | 12/1966 | Mundt |
| 3,360,846 A | | 1/1968 | Schellstede et al. |
| 3,566,965 A | | 3/1971 | Solum |
| 3,652,138 A | | 3/1972 | Collett |
| 3,729,797 A | * | 5/1973 | Ambrose ........... B23K 37/0533 269/45 |
| 3,916,998 A | | 11/1975 | Bass, Jr. et al. |
| 4,146,060 A | | 3/1979 | Garrett |
| 4,189,817 A | * | 2/1980 | Moebius ............. B25B 27/10 29/237 |
| 4,363,360 A | | 12/1982 | Richey |
| 4,367,053 A | | 1/1983 | Stratienko et al. |
| 4,434,125 A | | 2/1984 | Lavender et al. |
| 4,531,582 A | | 7/1985 | Muse et al. |
| 5,253,407 A | * | 10/1993 | Jamrus ............... G21C 13/067 29/245 |
| 5,501,281 A | | 3/1996 | White et al. |
| 5,517,878 A | | 5/1996 | Klein et al. |
| 5,706,894 A | | 1/1998 | Hawkins, III |
| 5,743,302 A | | 4/1998 | McNeely |
| 5,817,952 A | | 10/1998 | Swisher et al. |
| 5,860,760 A | | 1/1999 | Kirk |
| 5,908,072 A | | 6/1999 | Hawkins |
| 6,361,243 B1 | | 3/2002 | Geib |
| 6,484,803 B1 | | 11/2002 | Gremillion |
| 6,679,325 B2 | | 1/2004 | Buytaert |
| 6,679,335 B2 | | 1/2004 | Slack et al. |
| 6,957,704 B2 | | 10/2005 | Rogers et al. |
| 7,159,619 B2 | | 1/2007 | Latiolais, Jr. et al. |
| 8,266,774 B1 | * | 9/2012 | Doty ..................... B25B 27/16 29/253 |
| 2002/0139537 A1 | | 10/2002 | Young et al. |
| 2003/0019637 A1 | | 1/2003 | Slack et al. |
| 2008/0156488 A1 | | 7/2008 | Thornton |
| 2009/0255666 A1 | | 10/2009 | Olsen et al. |
| 2010/0326671 A1 | * | 12/2010 | Buytaert .............. B25B 27/10 166/378 |
| 2012/0151727 A1 | * | 6/2012 | Dewell ................ B25B 27/10 29/237 |

OTHER PUBLICATIONS

Frank's Anaconda Stop Collar Sheet, Frank's Casing Crew & Rental Tools, Inc. Lafayette, LA, 2003.
Author Unknown, International Search Report and Written Opinion dated Dec. 23, 2010, PCT Application No. PCT/US2010/037441, filed Jun. 4, 2010, pp. 1-16.
Non-Final Office Action dated Aug. 14, 2013, U.S. Appl. No. 12/756,177, filed Apr. 8, 2010, pp. 1-16.
Final Office Action dated Feb. 1, 2013, U.S. Appl. No. 12/756,177, filed Apr. 8, 2010, pp. 1-20.
Non-Final Office Action dated Sep. 13, 2012, U.S. Appl. No. 12/756,177, filed Apr. 8, 2010, pp. 1-23.

* cited by examiner

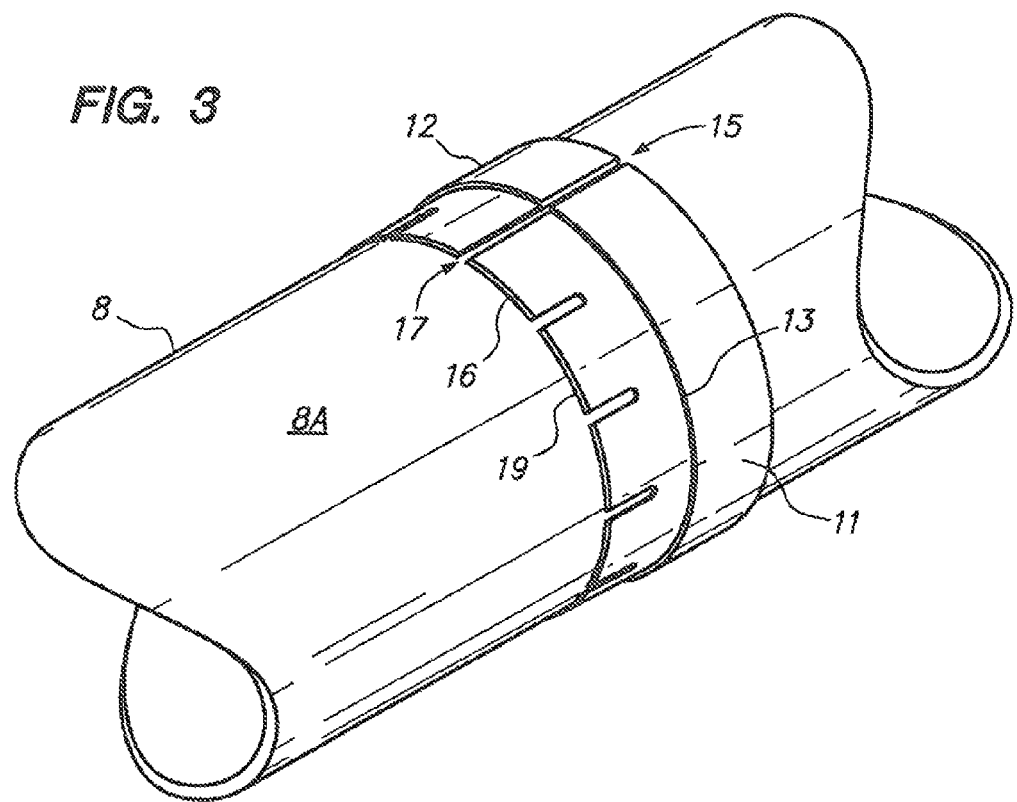

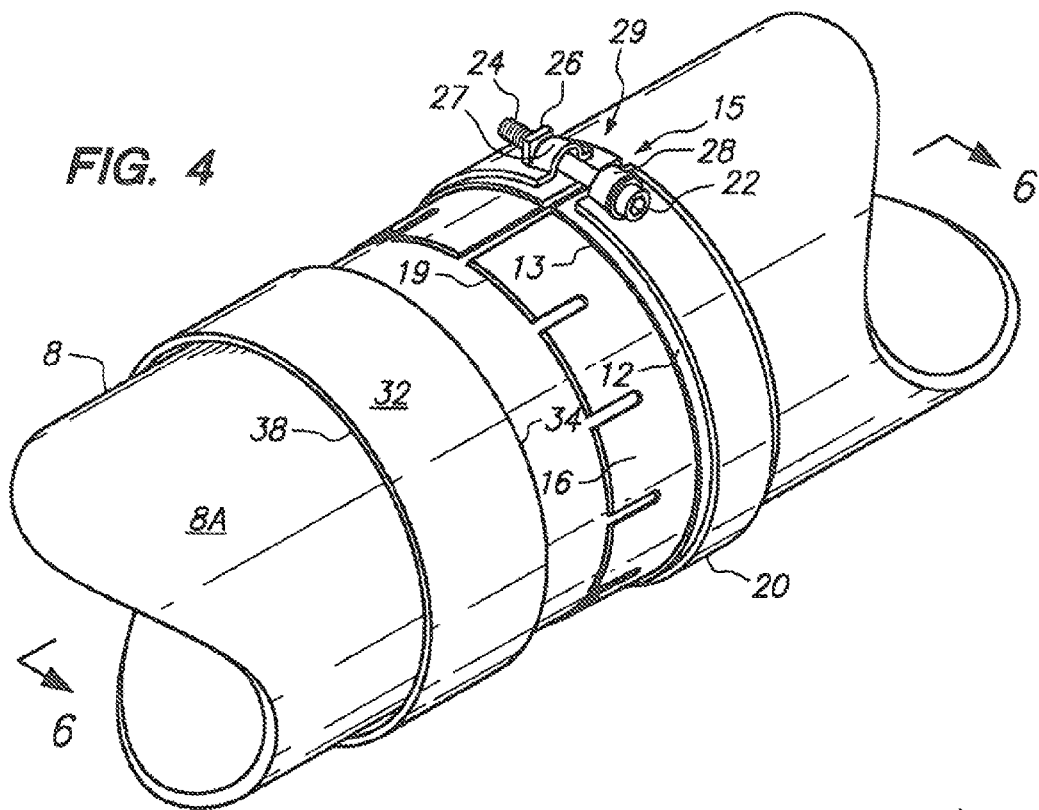
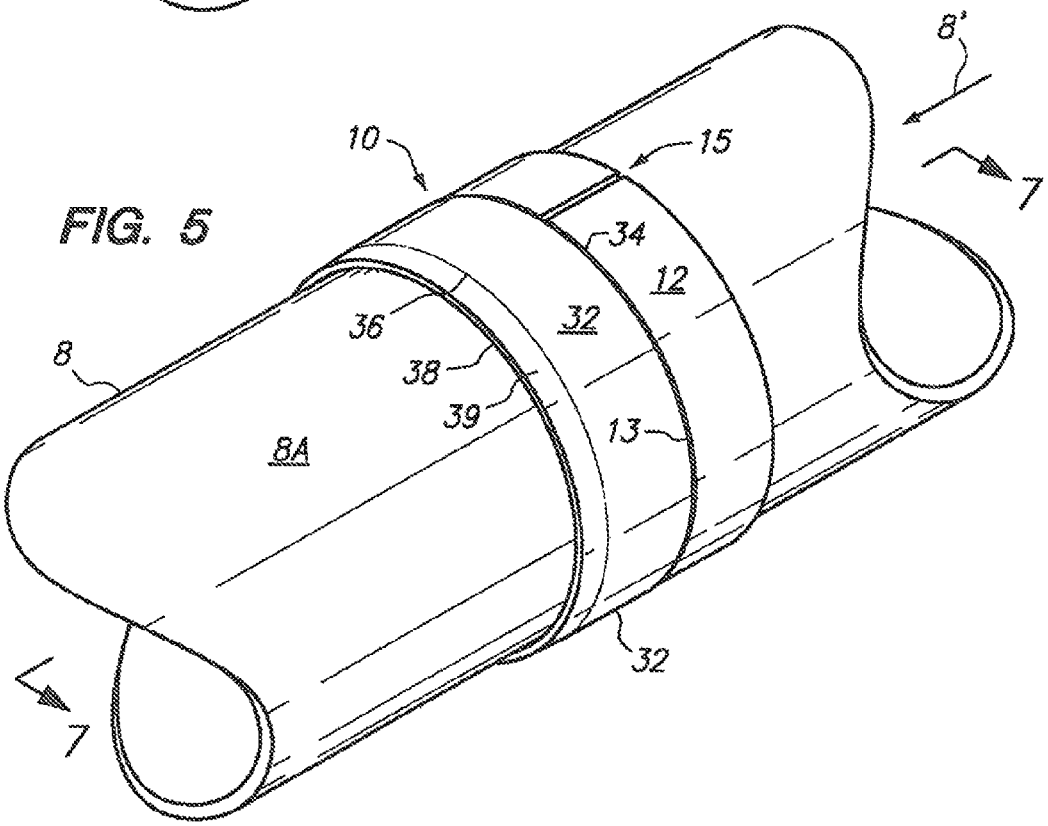

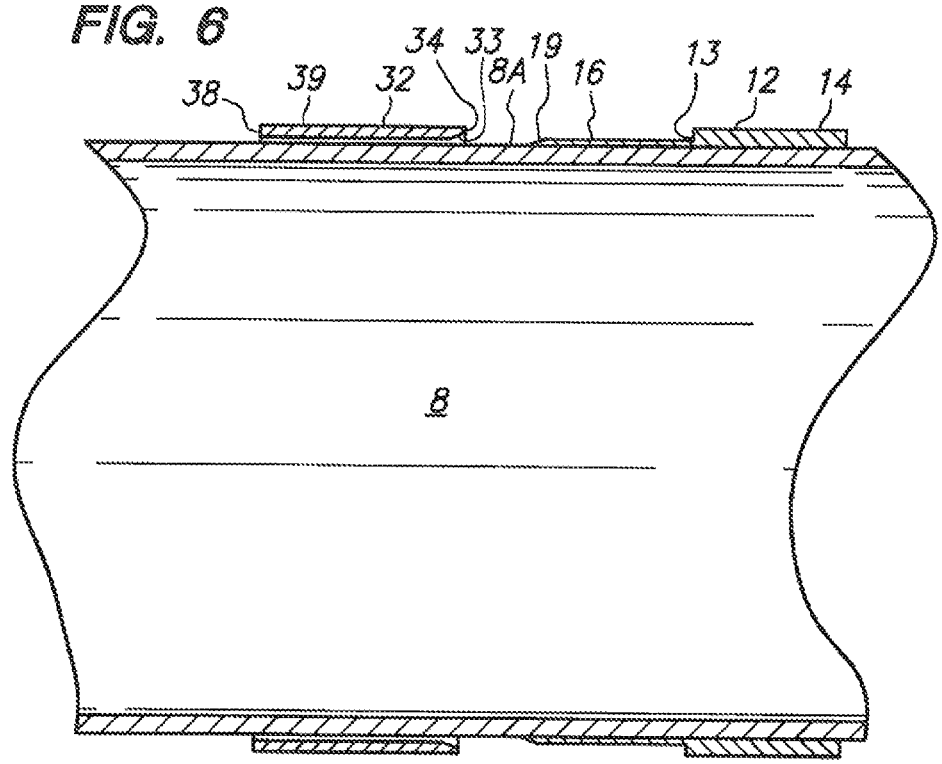
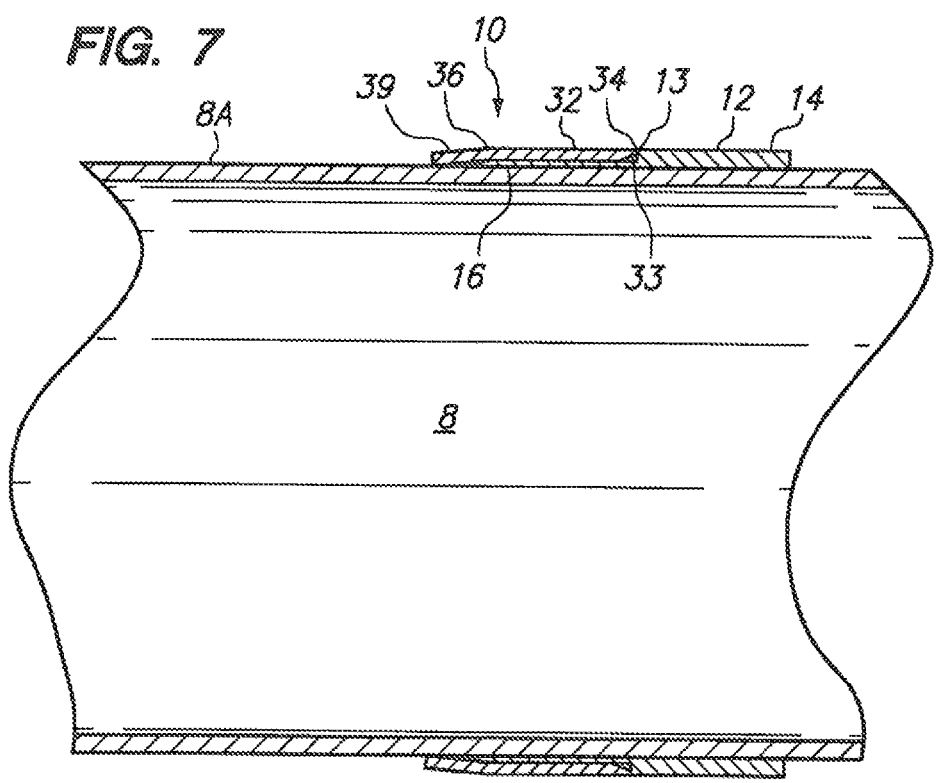

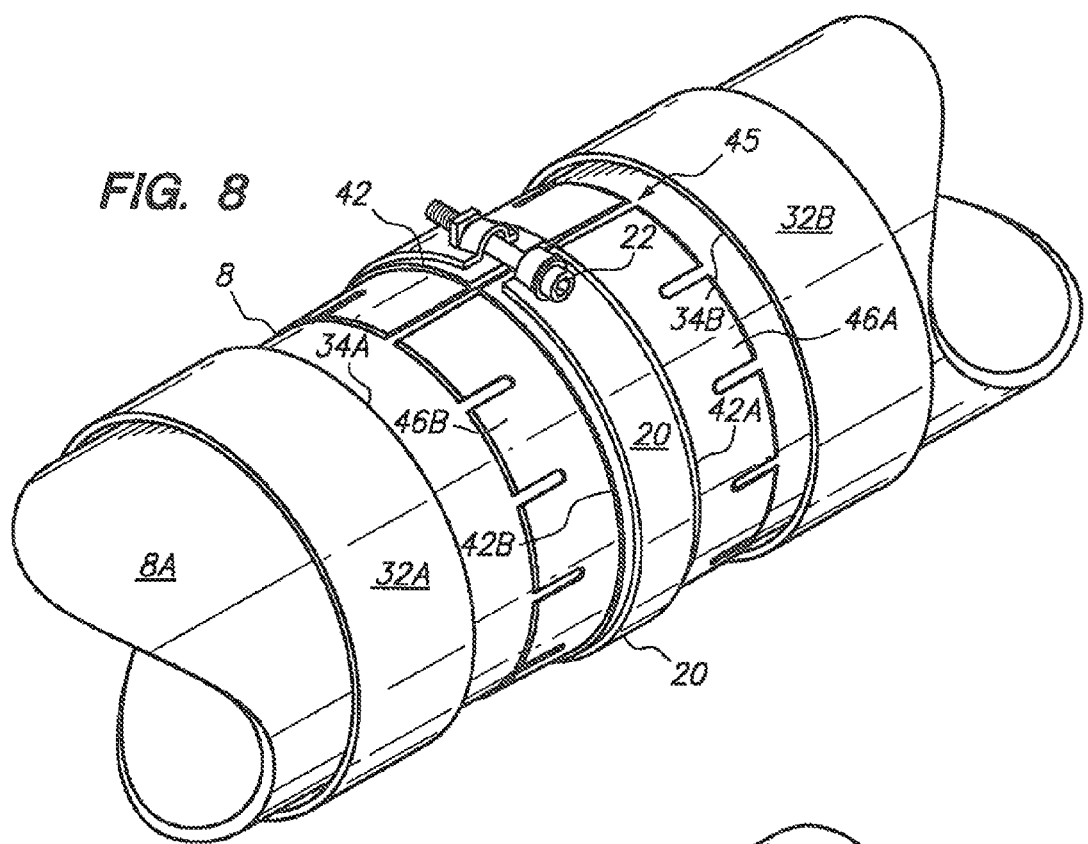
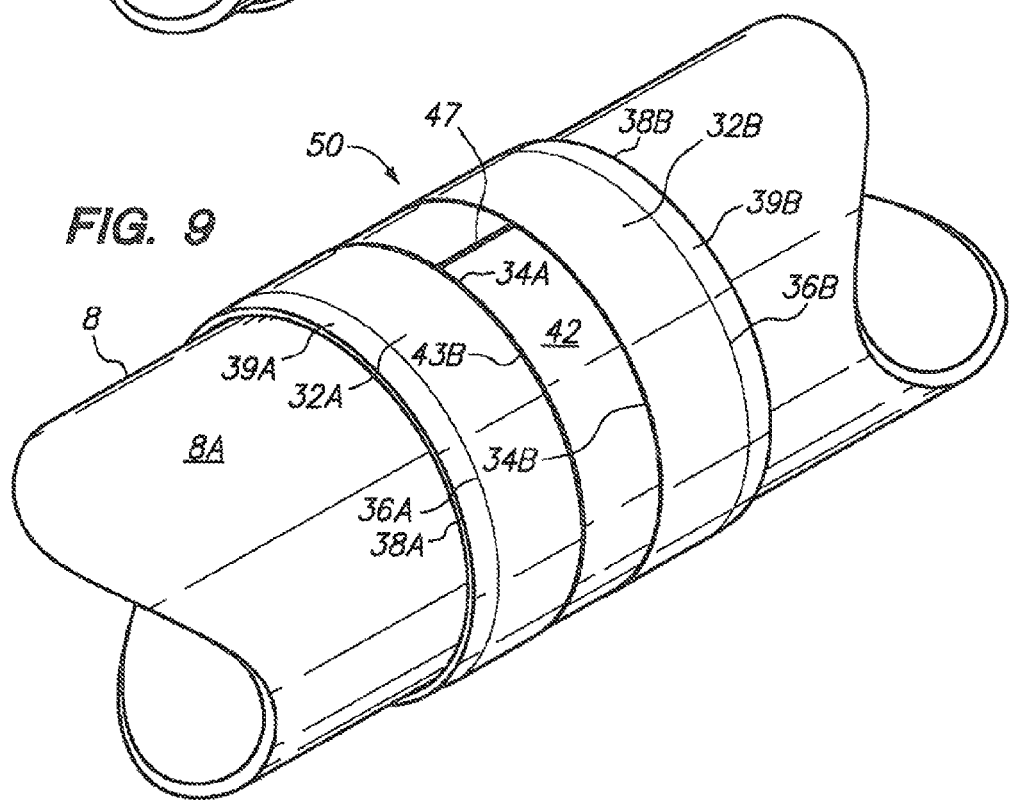

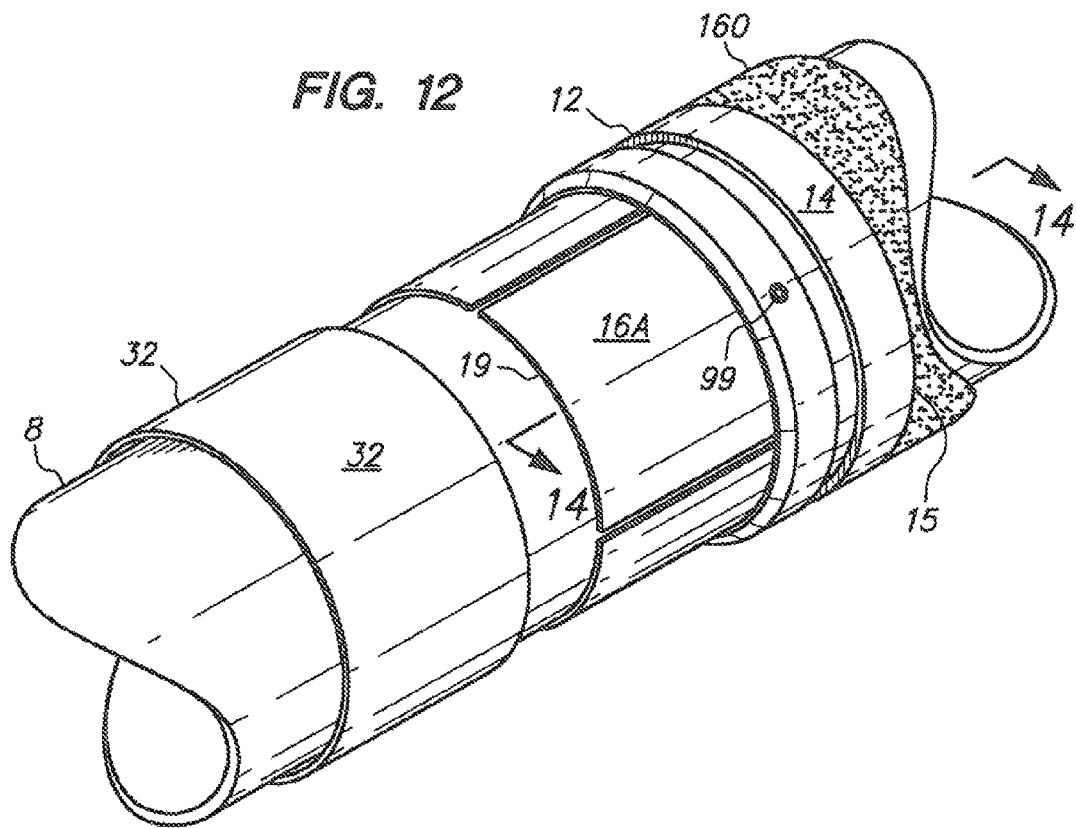
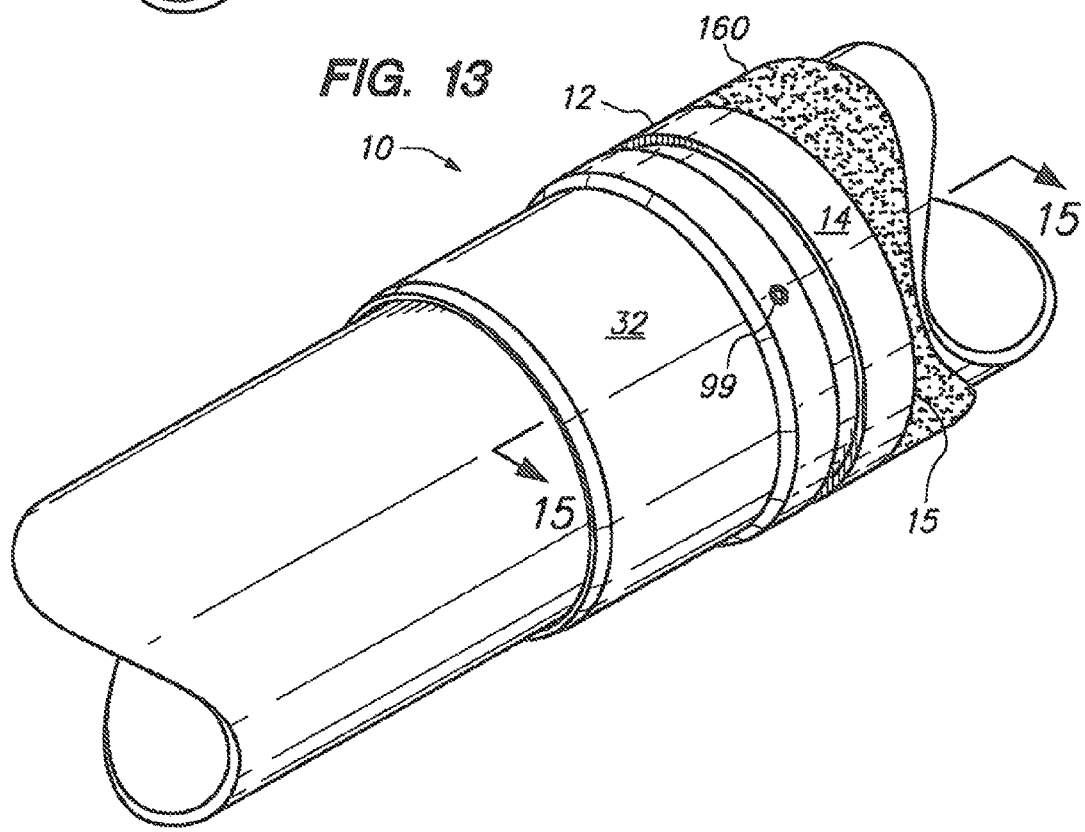

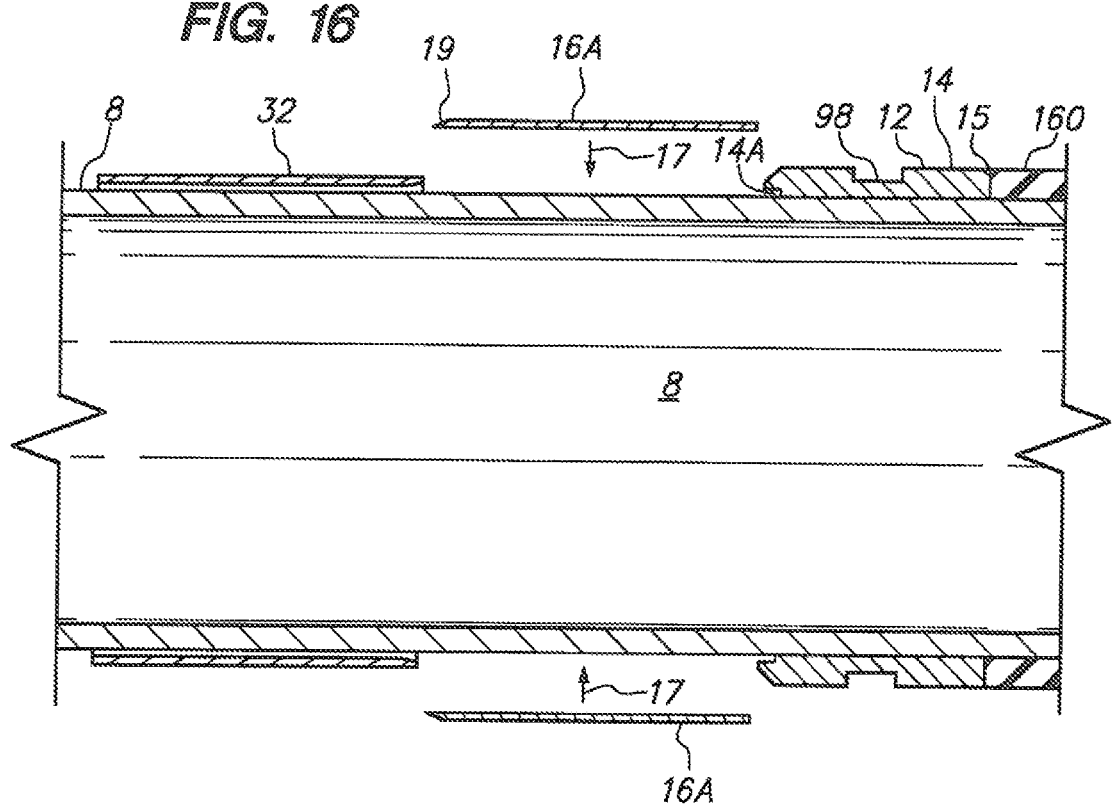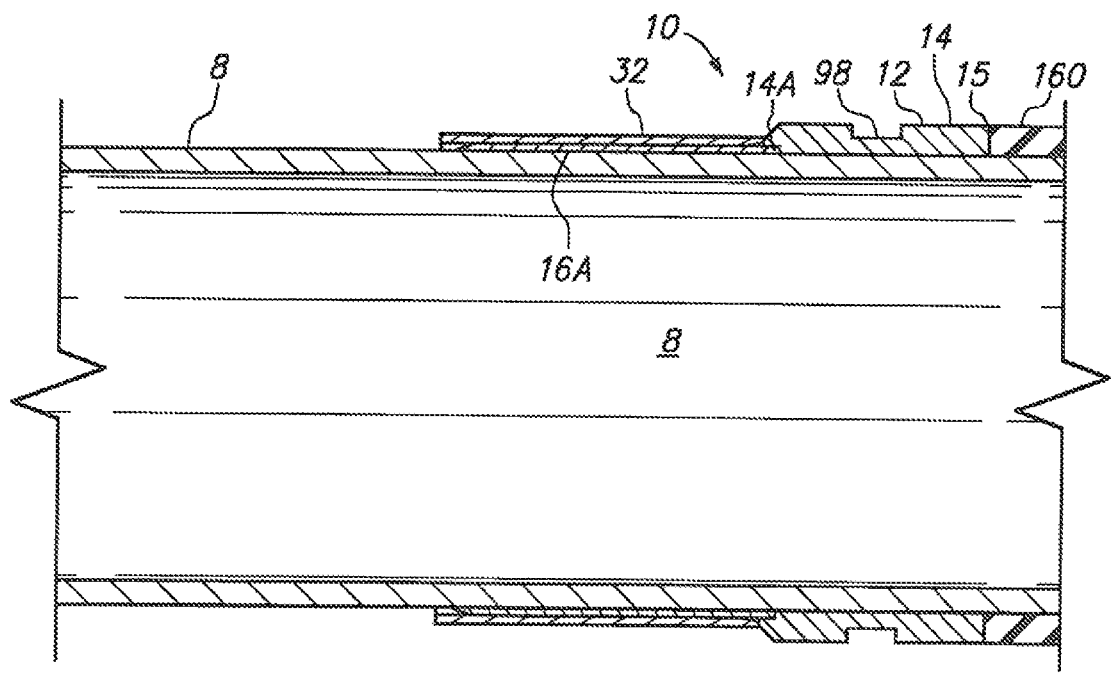

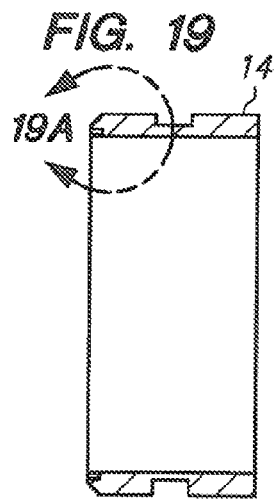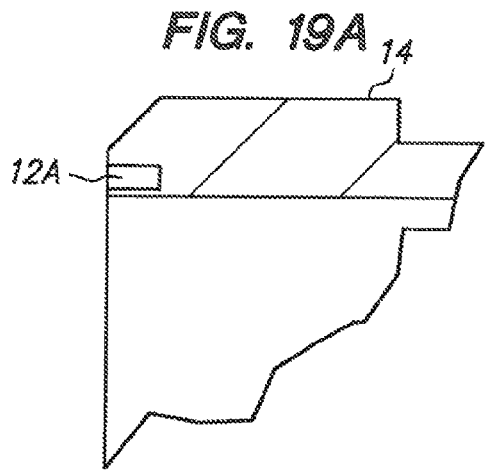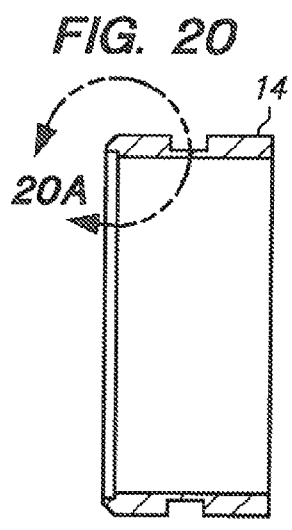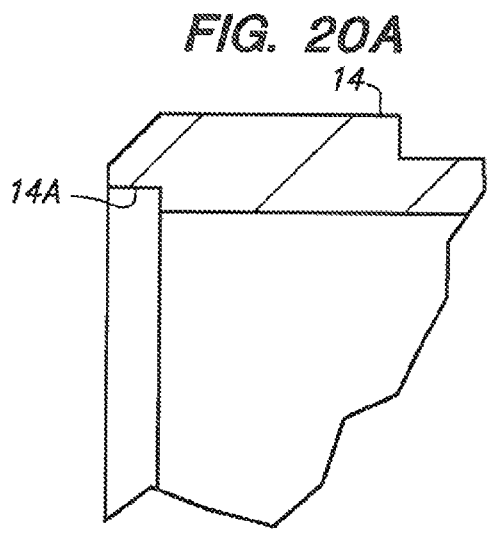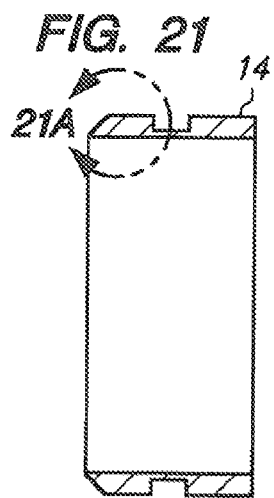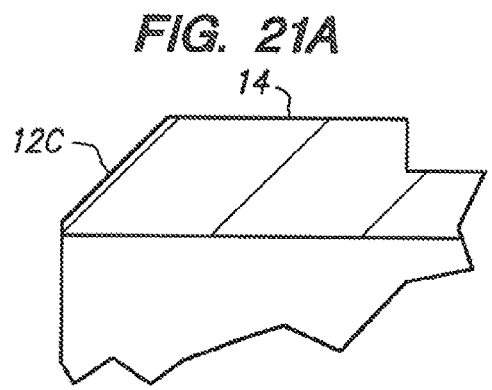

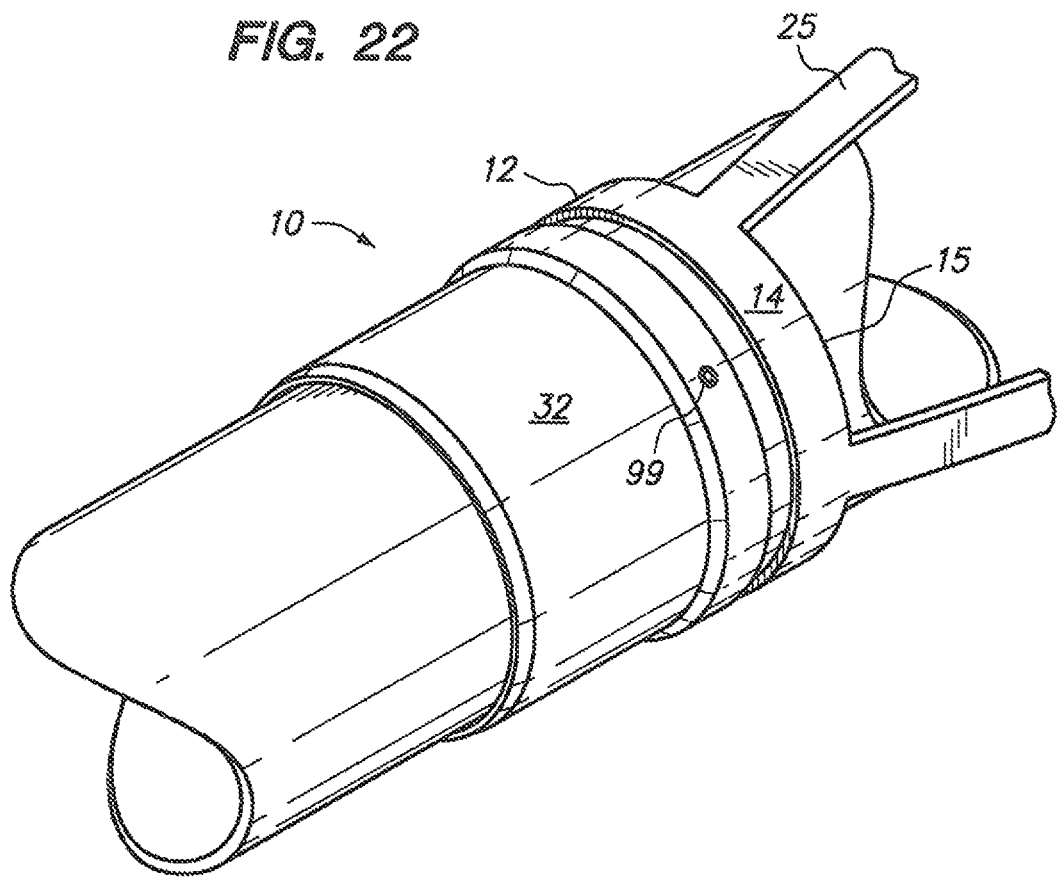

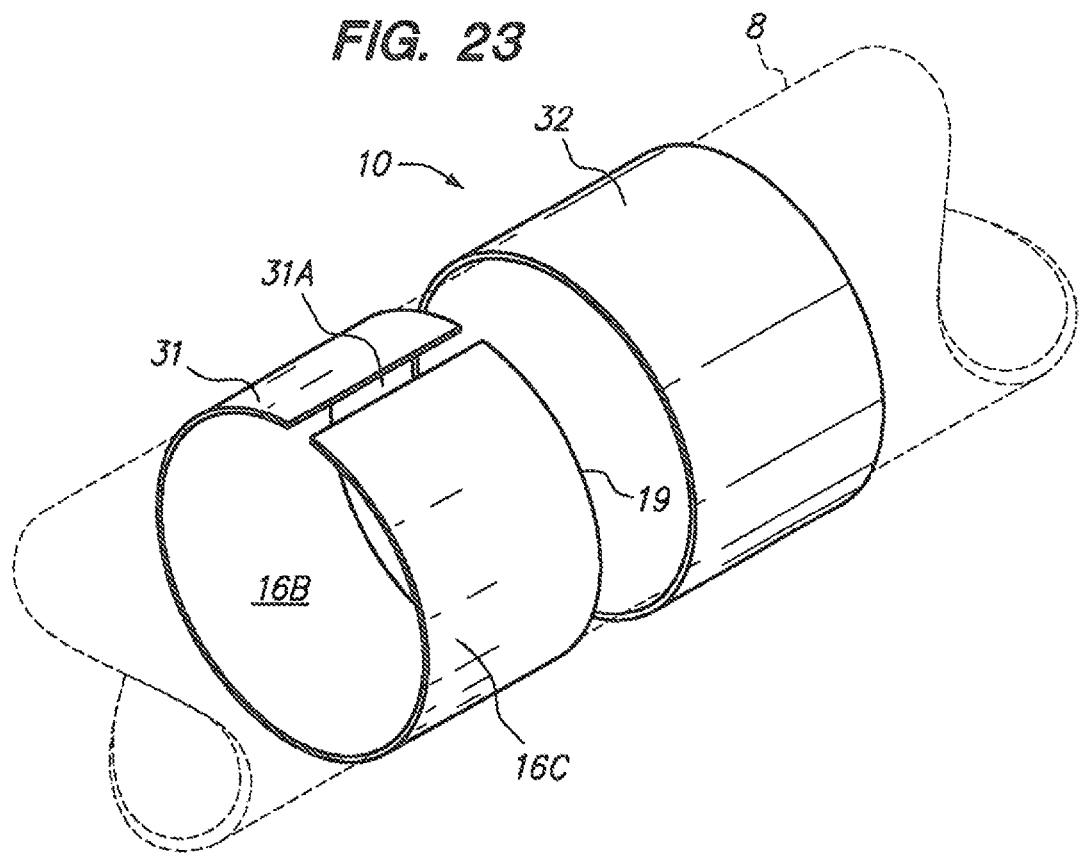
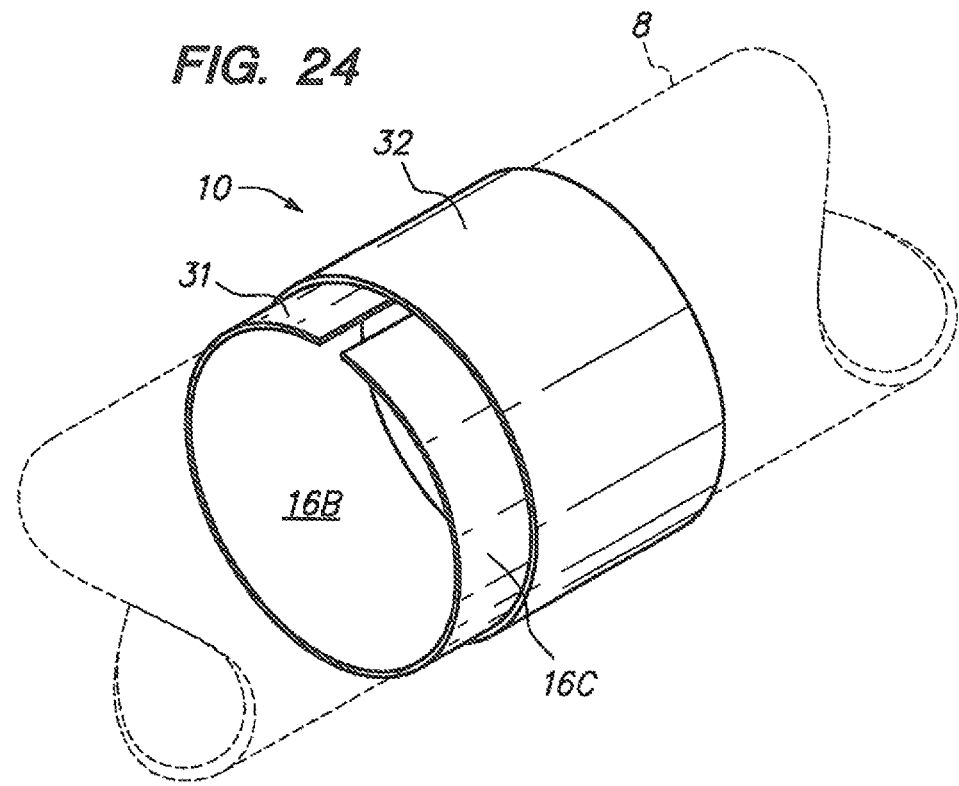

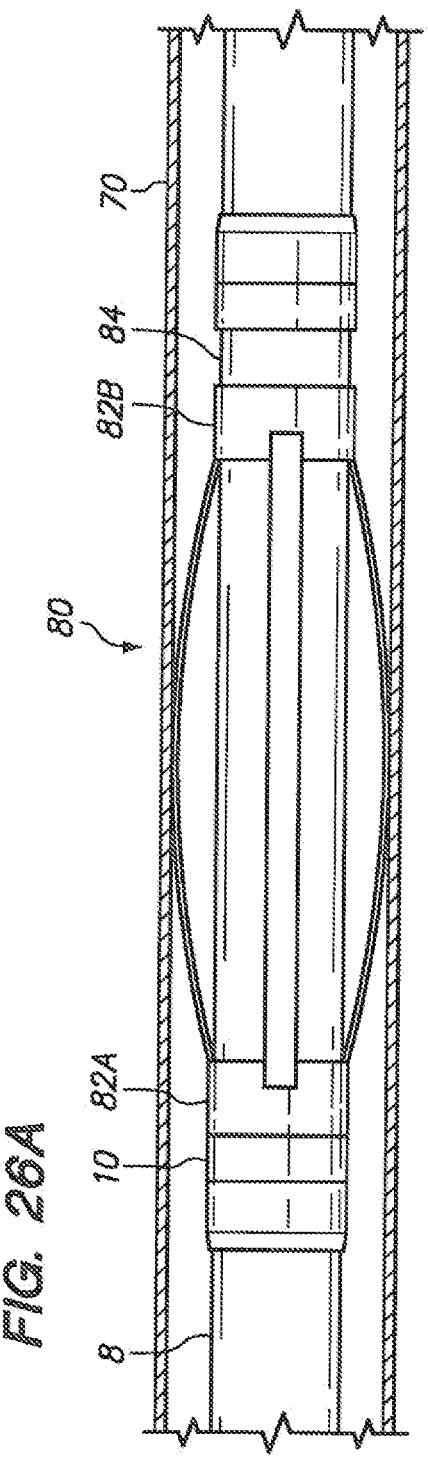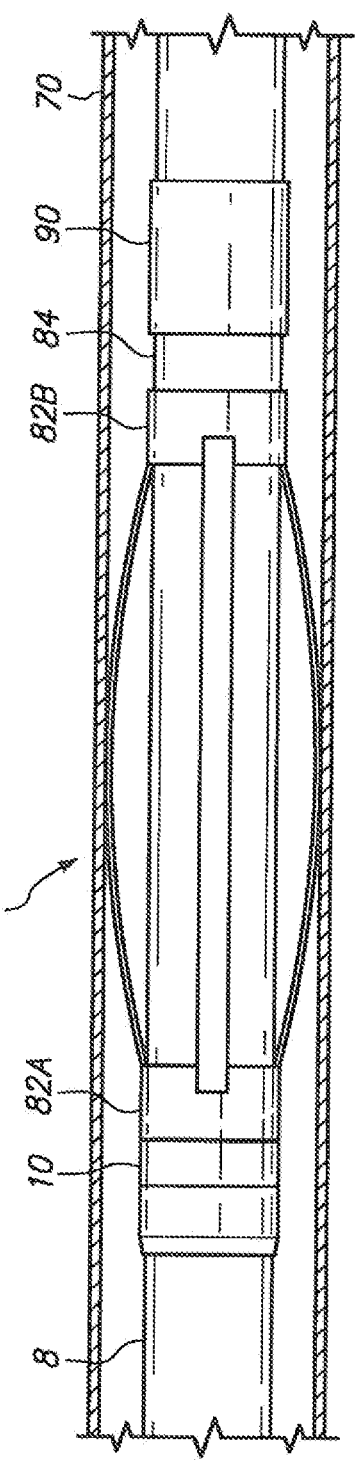

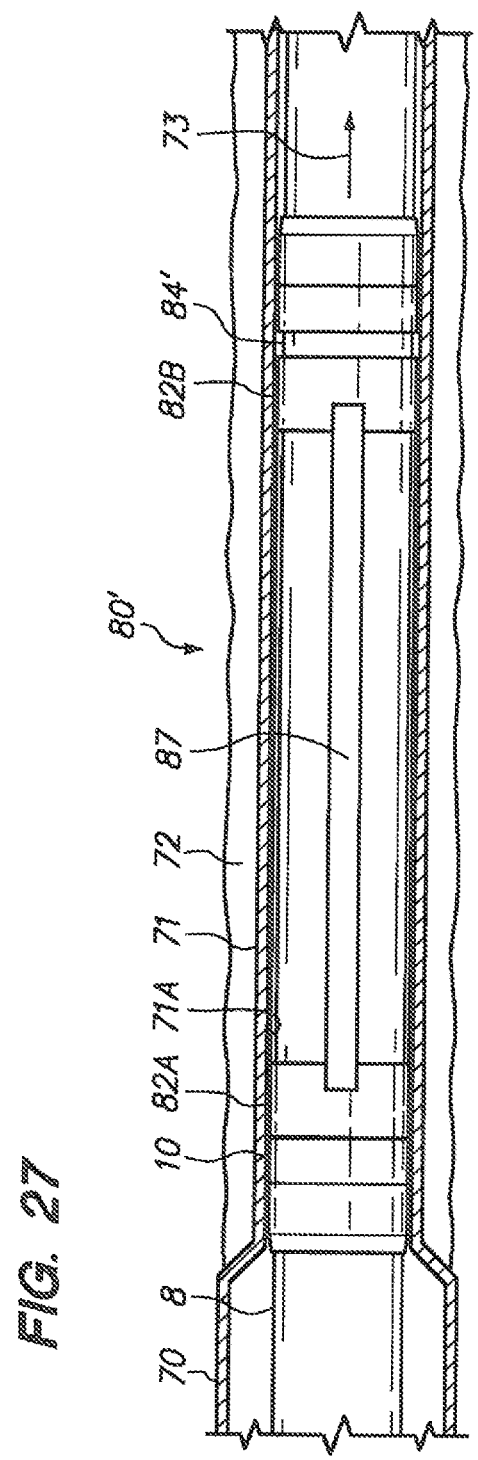

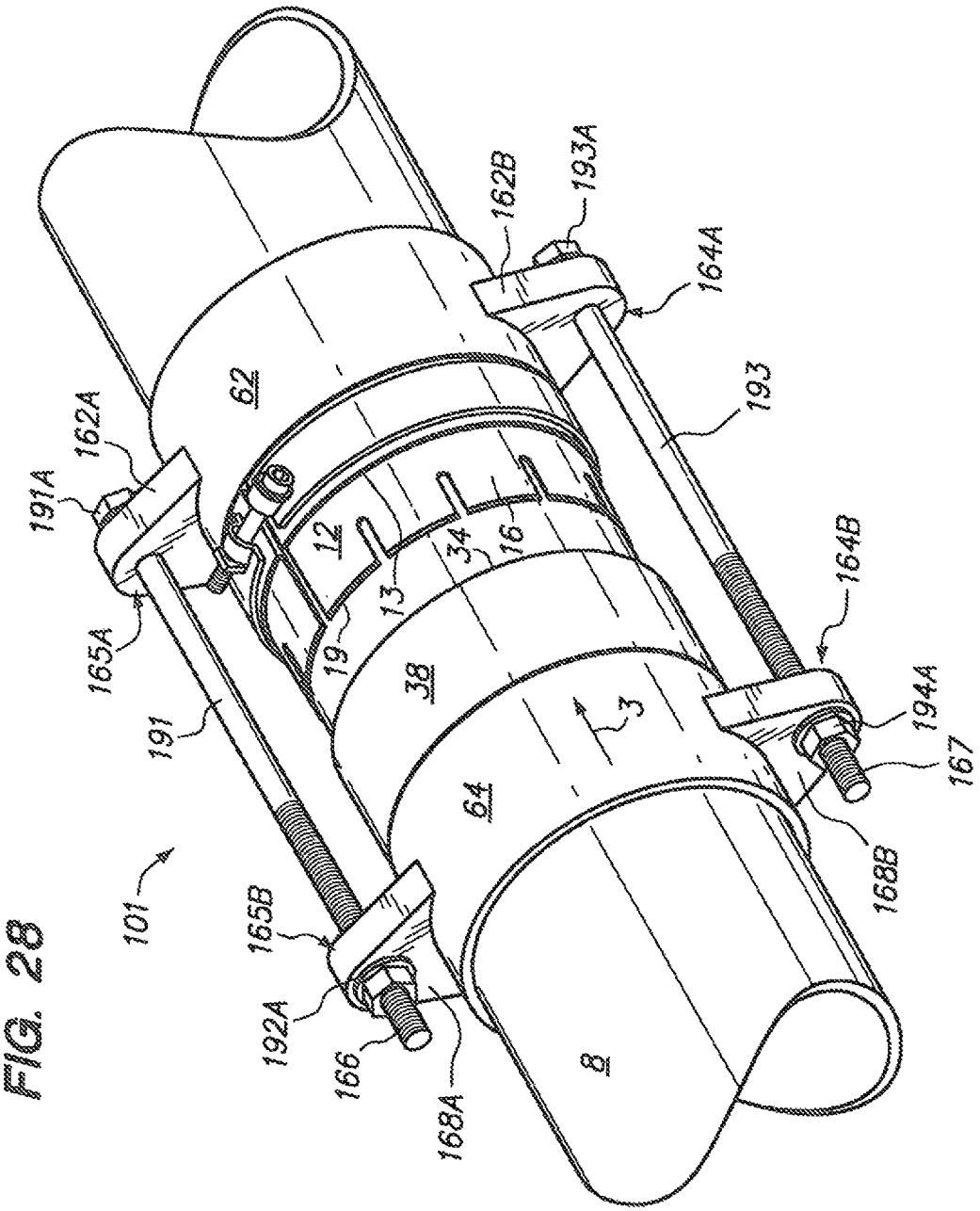

INTERFERENCE-FIT STOP COLLAR AND METHOD OF POSITIONING A DEVICE ON A TUBULAR

STATEMENT OF RELATED APPLICATIONS

This application is a divisional of U.S. patent application Ser. No. 12/756,177, filed on Apr. 8, 2010, which depends from and claims priority to U.S. Provisional Application No. 61/287,665 filed on Dec. 17, 2009, U.S. Provisional Application No. 61/237,202 filed on Aug. 26, 2009, U.S. Provisional Application No. 61/221,716 filed on Jun. 30, 2009, and U.S. Provisional Application No. 61/167,482 filed on Apr. 7, 2009. The entirety of each of these priority documents is incorporated herein by reference.

BACKGROUND OF THE INVENTION

1. Field of the Invention

This application relates to tubulars, for example, tubulars used in transporting fluids, in drilling, completion and/or production of oil and gas wells, or in injecting and/or producing gas, brine and/or water. This invention also relates to methods and apparatuses to hold to tubulars.

2. Brief Description of the Related Art

Tubular strings may be used, for example, to transport fluids and to produce water, oil and/or gas from geologic formations through earthen bores. In geologic applications, a drilled bore may be cased with a string of tubulars (e.g., a casing) to prevent collapse of the bore and to facilitate deeper drilling. In casing operations, a number of devices are generally coupled to a tubular. For example, devices that may be coupled to a tubular may include bore wall scrapers and wipers, packers, centralizers and landing collars. Devices may be coupled to a tubular, either at a fixed position or within a range of positions, using holding devices called stop collars.

Stop collars may be used to limit or prevent movement of a device coupled on the exterior of a tubular. A device may be coupled to a tubular in a floating mode (e.g., axially and radially slidable) intermediate two axially-spaced stop collars secured to the tubular. For example, a bow-spring centralizer may be movable along a tubular, but limited from further axial movement by the end collars of the centralizer being disposed between two stop collars (or intermediate a stop collar and a non-flush tubular connection). This configuration is called a straddling configuration, and permits the centralizer to "float" or move along the exterior of the tubular within a range defined by the axial separation of the stop collars (or by the axial separation of a stop collar and a non-flush tubular connection).

A bow-spring centralizer may be coupled to a tubular in a floating mode using a stop collar secured to the tubular between the two end collars of a bow-spring centralizer, e.g., within the span of the bow-springs. This configuration facilitates pulling the bow-spring centralizer through restrictions during the running of the tubular into a bore.

In another application, stop collar may be used to position an expandable packing member on a tubular to form a packer. In one packer embodiment, stop collars may serve a dual purpose. First, the stop collars may each comprise a packer face disposed to straddle the packing member and thereby limit or prevent axial expansion of the packing member. Second, the stop collars may prevent a pressure differential applied across the expanded packing member from moving the packing member relative to the tubular. Pressure differentials may be applied across a packing member in, for example, cementing, perforating, fracture isolation and other downhole operations.

FIG. 1A is schematic of a packer 110 comprising an expandable packing member 160 received on a tubular 8 between straddling stop collars 132 and 134. The tubular 8 and packer 110 are illustrated as being run into a bore 7 of a larger tubular (e.g., casing) 88. Depicted stop collars 132 and 134 each comprise packer faces 132A and 134A, respectively, that engage ends of the packing member 160 to restrict movement of the packing member 160 during running of the tubular into the bore 7. The packing member 160 may comprise a material that swells upon contact by an activating fluid (not shown) to an expanded mode, for example as illustrated in FIG. 1B, to isolate an annulus first portion 7A from an annulus second portion 7B.

After expansion of a packing member 160', e.g., in the configuration illustrated in FIG. 1B, the packer faces 132A and 134A may stabilize the packing member 160' of FIG. 1B against being moved by a pressure differential between the annulus first portion 7A and the annulus second portion 7B. The packer faces 132A and 132B may be disposed at an angle to an axis of the bore of the tubular 8, which angle may be perpendicular as illustrated in FIG. 1B or any other angle desired.

Instead of a swellable packing material, a packer may comprise an inflatable packing member. The tubular and the attached packer may be run into a bore and the packing member may be inflated using a source of pressurized fluid. As with the swellable packing member, the packer faces may also restrict the axial expansion of an inflatable packing member and thereby force the packer to radially expand upon inflation of the packing member to engage the bore 7, which may be the bore of a larger tubular, such as casing, or the bore of an uncased earthen hole.

In low-clearance applications, the thickness of a stop collar is an important design parameter because a stop collar adds to the positive outer diameter (P.O.D.) of the tubular and may determine whether the tubular to which the stop collar is coupled will pass a bore restriction. Restrictions may be presented by, for example, the diameter of the bore of a tubular larger than the tubular to which the stop collar is secured (e.g., casing), a blow-out preventer (BOP), valve, liner or a bore irregularity. As a result, a low-clearance stop collar may be essential to certain downhole operations.

Load capacity may also an important design factor relating to stop collars, especially for low-clearance stop collars. A stop collar may be required to bear potentially large forces imparted to the stop collar while moving the tubular through the tightest passable restrictions. The tubular string may weigh hundreds of tons, and forces imparted to a stop collar, for example, due to impact with a restriction, may exceed about 45 kN (10,116 pounds).

As another example of how loads may be imposed on a stop collar, a low-clearance, bow-spring centralizer may be coupled to a tubular using a low-clearance stop collar secured to the tubular between the end collars of the bow-spring centralizer. The bow-spring centralizer may pass through bore restrictions that require flexible collapse the bow-springs to lie substantially flat along the exterior of the tubular on which the centralizer is coupled. A low-clearance stop collar secured to the tubular between the end collars of the centralizer will not substantially impair collapse of the bow-springs. The reactive force provided by the stop collar to pull the leading end collar of the centralizer through such a restriction will be at least equal to the force imparted by the restriction on the bow-springs of the centralizer as they collapse to lie along the exterior of the tubular.

Conventional stop collars may be too large in outer diameter for certain applications. Additionally, conventional stop collars may not provide sufficient holding force without damaging the tubular. A conventional stop collar may be coupled to a tubular using, for example, a set screw. For example, a set screw comprising a shaft threadably received in an aperture machined in a collar. The shaft is rotatable to threadably advance radially inwardly to engage and bite into the exterior of the tubular. Set screw-type stop collars rely on highly localized contact with the tubular and typically do not provide adequate load capacity on tubulars of hardened materials, such as high-carbon steel or other extremely hard alloys, because the set screw does not sufficiently penetrate the surface of the hardened tubular. Even a set screw-type stop collar having multiple set screws "bites" into only a small cumulative area on the tubular, and the load capacity is limited, especially on hardened tubulars.

When the load capacity of a set screw-type stop collar is exceeded, the set screws may slip and cause scratching and scoring of the tubular, thereby damaging any protective coatings and/or possibly creating corrosion initiation sites.

Other conventional stop collars may be crimped onto a tubular. FIG. 2 is schematic of a prior art expandable packer (packing member 165 in the retracted mode) mounted on a mandrel having internally threaded connections 124 at the ends for connection between adjacent tubular segments of a tubular string. The collars 125 and 129 may include set screws 99 to position the collars on the tubular 8 to be crimped, by application of radially inward forces, to grip the tubular 8 and prevent movement of the packing member 162 along the mandrel 123. In the crimping process, the collars 125 and 129 are deformed to engage the tubular 8.

A shortcoming of crimped stop collars is that they generally require deformation of the wall of the tubular 8 (or the mandrel) on which the stop collar is installed in order to provide sufficient load capacity, and deformation of the tubular (or the mandrel) may be impractical or undesirable. Also, crimping a collar onto a tubular may require a heavy machine to generate the forces required to deform the collar and/or the tubular, and this requirement may prohibit field installation. A shortcoming of a sub-mounted packer (see FIG. 2) is that the packer must be positioned at a threaded connection within a tubular string, and it cannot be conveniently disposed at any location along any tubular segment.

Another type of stop collar comprises an adhesively-secured pad of epoxy adhesive and/or plastic resin material disposed in a pre-activated condition on the exterior of a tubular using, for example, the method disclosed in U.S. Pat. No. 7,195,730 to Calderoni, et al. The epoxy adheres to the tubular and resists movement once the epoxy or plastic resin cures. Adhesively-secured stop collars, like set-screw type stop collars, may lack sufficient load capacity required to, for example, push or pull a centralizer through a tight restriction. Adhesively-secured stop collars may also require careful surface preparations such as, for example, cleaning, degreasing, brushing and/or sand blasting, to ensure that the adhesive will adhere to the tubular. Adhesively-secured stop collars may also require a period of inactivity after application for the adhesive to cure enough for the stop collar to bear a load. Other stop collars may comprise a plastic compound or resin molded onto the tubular. A stop collar comprising a plastic compound molded onto the tubular may chip or shatter from impact with bore restrictions, and a piece of the stop collar may break off and become lodged in a critical piece of equipment, such as a BOP or valve, or it may otherwise impair movement of the tubular within a the bore.

What is needed is a stop collar for securing a device on a tubular that can be installed at a field location, such as a pipe yard or on a rig. What is needed is a stop collar that can be installed at any position along the length of a tubular. What is needed is a stop collar that is compatible with low-clearance applications. What is needed is a stop collar that provides a sufficient load capacity. What is needed is a stop collar that is compatible for use on expandable tubulars. What is needed is a stop collar that can reliably secure a device to premium grade or hardened tubulars. What is needed is a stop collar that minimizes or eliminates marking, scarring and scoring of the tubular on which it is secured. What is needed is a stop collar that can be secured to a tubular without the need for heavy machines, without highly skilled personnel, and without the need for time-consuming surface preparation. What is needed is a stop collar that can be secured on a tubular in any climate.

SUMMARY

Embodiments of the stop collar and method disclosed herein satisfy all of the above-stated needs. In one embodiment, a stop collar comprises a base having a bore receivable onto a tubular, one or more fingers extending from the base in a first direction along the exterior of the tubular, and a sleeve with a bore receivable onto the tubular and onto the fingers extending from the base in an interference-fit. The base and the sleeve may be coupled, one to the other, and both to the tubular, by receiving the sleeve over at least a portion of the fingers to form an interference-fit stop collar. The resulting large grip area secures the stop collar firmly to the tubular. In one embodiment, the sleeve may be disposed toward the leading end of the tubular (e.g., the first end to enter the bore) so that friction and/or impacts with bore restrictions urge the sleeve further onto the fingers of the base in a self-tightening mode.

An embodiment of a method of securing a stop collar to a tubular includes the steps of receiving a bore of a base on a tubular with a set of fingers (comprising at least one finger) extending from the base along the exterior of the tubular, receiving the bore of a sleeve on the tubular adjacent the set of fingers, and receiving the bore of the sleeve on at least a portion of the set of fingers in an interference-fit. The elasticity of the sleeve material maintains a grip on the portion of the set of fingers within the bore of the sleeve.

The load capacity of a stop collar formed using the method disclosed herein is superior to that of conventional stop collars. Further, an embodiment of a stop collar installed on a tubular using the method disclosed herein will grip the tubular without marking, scratching or scoring the exterior of the tubular. As a result of the large grip area and the generally uniform grip pressure across the grip area, embodiments of stop collars disclosed herein provide excellent load capacity with minimal contribution to the effective P.O.D.

In an embodiment of the stop collar, the base may comprise a second set of fingers (comprising at least one finger) extending from the base in a direction generally opposite the direction of extension of a first set of fingers. The alternate embodiment of the base may be further secured to the tubular by the steps of receiving the bore of a second sleeve on the tubular adjacent the second set of fingers, and receiving the bore of the sleeve on at least a portion of the second set of fingers in an interference-fit. A stop collar formed using this method provides increased load capacity because of the additional grip area.

The outer diameter of tubulars may vary by about 2%. In an alternate embodiment of the stop collar disclosed herein, the base may comprise a bore interrupted by a gap passing through a wall of the base. The gap may, in one embodiment, be longitudinal, e.g., parallel to the axis of the bore of the base. This configuration provides a base with a bore that is variable within a limited range determined by the elasticity of the base material, and a bore that can flexibly accommodate tubular outer diameter. For example, the bore of a base may be enlarged by flexibly widening the gap to expand the bore to receive a tubular having an outer diameter larger than a relaxed diameter of the bore of the base. As another example, a bore of a base may be reduced by flexibly closing (e.g., narrowing) the gap, e.g., to cause the base to fit more snugly on a portion of a tubular having an outer diameter smaller than the relaxed diameter of the bore of the base. Optionally, a clamp may be used to conform the bore of the base to the tubular exterior, and the clamp may also serve to secure the base to the tubular during the installation of a sleeve on the set of fingers. The presence of a gap in the wall of the bore of the base makes the stop collar more compatible with expandable tubulars because the base will plastically deform, by opening of the gap, as the tubular on which the stop collar is installed expands. The base opens at the gap and remains on the exterior of the expanded tubular instead of breaking upon expansion of the tubular and becoming unwanted debris in the bore.

In another embodiment for accommodating tubular outer diameter, the base may comprise two or more separate portions, each having an arc span of a radius generally corresponding to the outer diameter of the tubular on which the stop collar is to be installed. For example, but not by way of limitation, two or more separate base portions may each comprise one or more fingers, and the two or more separate base portions may be positioned one generally adjacent the other(s) on the exterior of a tubular and secured in their positions on the tubular using a clamp. A bore of a sleeve may be received on the tubular adjacent the fingers extending from the adjacent base portions, and the bore of the sleeve may be received onto at least a portion of the fingers in an interference-fit to form a stop collar and to secure the two or more base portions one adjacent the other(s). This embodiment of the stop collar may comprise, for example, two base portions having up to 180 degrees of arc span, three base portions having up to 120 degrees of arc span, etc. It is not necessary that the separate base portions have the same arc span, only the same approximate arc radius, and it is not necessary that the cumulative arc span of the base portions sum to 360.

In one embodiment, the base may have an outer diameter generally equal to the outer diameter of the sleeve, post-installation. This structure provides an embodiment of a stop collar having a generally uniform, flat surface across the interface of the base and the installed sleeve.

An embodiment of a method of installing a stop collar on a tubular includes a step of providing a plurality of sleeves having a range of bore diameters to provide favorable matching of the bore of the sleeve to the diameter around the fingers of the base. For example, after a base is clamped in a position on a tubular, such as a unitary base or a base having two or more base portions, a sleeve may be selected to provide the tightest available grip on the fingers without being so small as to impair installation of the sleeve onto the fingers.

In another embodiment of a stop collar and method of installing a stop collar on a tubular, one or more of the fingers may be frangible to enable selective removal from the base. An embodiment of the stop collar having a base of this type is compatible for use with a sleeve having a bore that, but for the frangible fingers of the base, would be too small to be installed on the fingers without the use of excessive force.

In one embodiment of the method of installing a stop collar on a tubular, one or more shims may be used to compensate for outer diameter of the tubular or to compensate for a tubular diameter that may be smaller than the diameter of the base. For example, instead of providing a discontinuity through the wall of the base so that the bore of the base can be flexibly conformed to a tubular having an outer diameter smaller than the bore of the base, shims may be inserted between the bore of the base and the tubular, or between the fingers of the base and the tubular, to ensure that the sleeve is received on the fingers in an interference-fit and to ensure that the installed stop collar is firmly secured on the tubular.

In one embodiment of the method of installing a stop collar on a tubular, the extension of the fingers from the base may be increased using alternate shims with, for example, a detent or cavity therein to receive a finger of the base. Extending the fingers using shims may enable the use of a wider sleeve (as measured along an axis of the bore of the sleeve) which, when received onto the extended fingers, may increase the grip area and the resulting holding force of the stop collar.

In one embodiment of a stop collar, a single finger may comprise a modified tubular member having a longitudinal gap in the wall. The single finger may comprise an interior surface generally conforming to the exterior of the tubular on which the finger is received, and a corresponding exterior surface generally conforming to the bore of a sleeve to be received onto the single finger in an interference-fit to form a stop collar. The angular span of curvature of the single finger may be less than 360 degrees to prevent full closure of the gap and/or overlapping of the ends adjacent the gap when the sleeve is installed on the single finger in an interference-fit to form the stop collar.

In one embodiment, the base comprises a fingerless base having a bore cooperating with a set of separate fingers (comprising at least one separate finger) that may be received in, on or against the fingerless base to form a base. In one embodiment, the set of separate fingers may be received in, on or against the fingerless base prior to receiving the sleeve onto the tubular or, in an alternate embodiment of the method, the fingerless base may be received onto the tubular adjacent the sleeve, and then the set of separate fingers may be disposed between the fingerless base and the sleeve. In one embodiment of the method, the separate fingers may be connected to the base by, for example, welding, wedging, or by using an adhesive, after the set of separate fingers are positioned in, on or against the fingerless base. This embodiment of the stop collar and method may substantially reduce the cost of manufacturing the stop collar components without impairing the ease of stop collar installation or load capacity. Separate-finger embodiments of the stop collar and method may substantially reduce labor costs by eliminating the need to machine the base with integral fingers. As with other embodiments, the fingerless base may also be coupled to or formed integrally with a component of a downhole device such as, for example, a packer, a centralizer, wall scratcher or wiper, or some other device to be coupled to a tubular.

In one separate-finger embodiment of the stop collar and method, a base may comprise a groove in a face of the fingerless base to receive a portion of each separate finger. The groove may be disposed in a face of the fingerless base, for example, opposite a packer face of the base. An embodiment of a method of assembling a stop collar using a set of separate fingers may include the steps of receiving the one or more separate fingers to a seated position within a groove in a face of a fingerless base, and then connecting the one or more fingers to the base by, for example, welding, wedging and end of the separate finger into the groove, or using an adhesive. The groove in the base may be continuous about its circumference, for example, to receive a single finger having an angular span of curvature near 360 degrees, or the groove may comprise strategically located dividers to divide the groove into a plurality of sections to receive and/or guide an end of a separate finger to a seated position within a section.

In another separate-finger embodiment of the stop collar and method, the base may comprise a bore with an enlarged bore portion adjacent a face of the base to receive an end portion of the separate fingers therein to a seated position between a wall of the enlarged bore portion and a tubular on which the fingerless base is received. A related embodiment of the method may include the steps of receiving a bore of a fingerless base on a tubular, receiving an end of a set of separate fingers within the enlarged bore portion of the fingerless base to a seated position to form a base, and connecting the set of separate fingers to the fingerless base by, for example, welding or using an adhesive. The embodiment of the fingerless base having an enlarged bore portion may comprise strategically located dividers to divide the enlarged bore portion into sections to receive and/or guide one or more fingers to a seated position within a section.

In another separate-finger embodiment of the stop collar and method, the fingerless base may comprise a backing face disposed at an angle to the bore to engage an end of a set of separate fingers. The backing face may be perpendicular to the bore of the fingerless base or it may be formed at a non-perpendicular angle to the bore. In a stop collar to be used with an expandable packer, for example, the backing face on a fingerless base may be disposed opposite a packer face on the fingerless base. An embodiment of a method of installing a separate-finger embodiment of a stop collar may include the step of abutting ends of the set of separate fingers against the backing face of the fingerless base and connecting the set of separate fingers to the fingerless base by welding or by using an adhesive.

One embodiment of a method of installing a stop collar may include the step of applying an uncured epoxy adhesive to certain components of the stop collar, for example, to the outer surface of a set of one or more fingers (which may be separate fingers) or to the bore of the sleeve, and prior to receiving the bore of the sleeve onto the fingers. The epoxy may perform as a lubricant to facilitate installation of the sleeve onto the set of fingers in an interference-fit and, later, the epoxy may cure to bond the sleeve to the fingers and enhance the grip of the sleeve on the set of fingers. Additionally or alternately, or in addition, the method may include a step of applying an uncured epoxy to the tubular and/or to the interior curved surfaces of the set of fingers to promote bonding between the stop collar and the tubular to improve load capacity.

One embodiment of a method of securing a stop collar to a tubular comprises providing a base (which may comprise a fingerless base and separate fingers) having a bore to receive a tubular so that one or more fingers extend from the base along the exterior of the tubular in a first direction, receiving the bore of a sleeve onto the tubular adjacent the fingers extending from the base, heating the sleeve to thermally expand the bore of the sleeve, receiving the expanded bore of the sleeve onto at least a portion of the fingers and heat shrinking the bore of the sleeve onto the fingers in an interference-fit to form a stop collar. The heat shrinking of the sleeve onto the fingers of the base secures the stop collar on the tubular without subjecting the exterior of the tubular to direct contact with the heated sleeve. Heat stored in the expanded sleeve dissipates quickly after the sleeve is received on the fingers of the base due to the large heat sink provided by the tubular and the high conductivity of the stop collar and tubular materials. As a result, embodiments of the stop collar installed using this method may be secured to a tubular without hindering the metallurgical condition of the tubular or the performance of any coatings or liners on the exterior of the tubular. The added steps of thermally expanding the sleeve and then heat shrinking the sleeve onto at least a portion of the fingers may be employed in connection with any of the embodiments described above including, but not limited to, a base having two or more separate portions, a fingerless base cooperating with a set of separate fingers, and a base having two sets of fingers extending in opposite directions one relative to the other.

In one embodiment of a method of installing a stop collar on a tubular, an installation tool may be used to receive the bore of the sleeve onto at least a portion of the set of fingers extending from a base in an interference-fit to form a stop collar. An embodiment of the installation tool may comprise two bodies straddling the base and the sleeve adjacent to the base. One or more drive members, such as a threaded bolt, screw jack, ratchet jack, and/or a fluidic (e.g., a pneumatic or hydraulic) cylinder, may be coupled intermediate the first body and the second body of the installation tool and, upon actuation of the drive member(s), the first body and second body adduct one toward the other about the base and the sleeve to install the bore of the sleeve onto the set of fingers to form the stop collar. An installation tool may have a plurality of drive members angularly distributed around the tubular to provide an evenly distributed net force to each of the bodies.

An additional advantage of some embodiments of the stop collar of the invention is that it may be assembled and installed on a tubular of any diameter, and installation may occur in any climate with portable equipment and without specialized labor. The methods of installing a stop collar disclosed herein may be used to assemble and install a stop collar on a tubular of any size and grade and at any location along any tubular segment of a tubular string. The method may be used to install a stop collar with generally portable equipment, and without the expense of specialized tools or highly-skilled labor.

The use of the modifier "stop" within the term "stop collar" should not be considered as limiting the use of the device to couple only stationary or fixed devices. The term "sleeve," as that term is used herein, refers to a member having a bore for receiving a tubular therethrough. In one embodiment, a sleeve may comprise two or more sleeve components that may be interlocked, assembled or coupled together to form the equivalent of a continuous structure about at least a portion of its bore.

A "finger," as that term is used herein, does not mean that the structure to which the term is applied is necessary shaped like a human finger, but instead that it merely extends. A "finger," as that term is used herein, may be, in one embodiment, generally flattened and radially thin, and may comprise an arc-shaped cross-section generally conforming to the exterior of the tubular on which the stop collar is to be coupled and/or to the interior surface of the bore of the sleeve to be received onto the finger to form a stop collar. A "finger" may be, in one embodiment, of uniform width and/or radial thickness along the length of its extension, or the width and/or radial thickness may vary along its length. A slot intermediate two adjacent fingers extending from a common first portion may be uniform or varied along its length, and a slot may or may not be aligned with the longitudinal axis of the tubular on which the stop collar is to be installed. In one embodiment, the fingers and/or slots there between may be spiral and/or helical in shape.

The foregoing and other features and aspects of embodiments of the invention will be best understood with reference to the following detailed description of one or more specific embodiments, when read in conjunction with the accompanying drawings, which illustrate some embodiments of the invention, wherein:

BRIEF DESCRIPTION OF THE DRAWINGS

FIG. 3 is a perspective view of a base that may be used to form an embodiment of a stop collar, the base having a bore to receive a tubular and a set of fingers extending from the base.

FIG. 4 is a perspective view of the base of FIG. 3 after the bore of a sleeve is received onto the tubular and a clamp is applied to secure the base in a position on the tubular.

FIG. 5 is a perspective view of one embodiment of a stop collar formed by receiving the bore of the sleeve onto the fingers extending from the base in FIG. 4.

FIG. 6 is a section view of FIG. 4 taken along the line 6-6 and showing the relative thicknesses of the base, the fingers extending from the base, the sleeve and the tubular. The clamp is omitted from the section view to better illustrate the relative thicknesses.

FIG. 7 is a section view of the stop collar of FIG. 5 taken along the line 7-7.

FIG. 8 is a perspective view of an alternate embodiment of a base having a first set of fingers extending along the exterior of a tubular in a first direction and a second set of fingers extending along the exterior of the tubular in a second and opposite direction, a bore of a first sleeve received on the tubular adjacent the first set of fingers and a bore of a second sleeve received on the tubular adjacent the second set of fingers.

FIG. 9 is a perspective view of the base of FIG. 8 after the bore of a first sleeve is received onto the first set of fingers and the bore of the second sleeve is received onto the second set of fingers to form an alternative embodiment of the stop collar with increased grip area as compared to the embodiment of the stop collar of FIG. 5.

FIG. 12 is a perspective view of the bore of the fingerless base of FIG. 10 received on a tubular and a portion of each of the separate fingers of FIG. 11 received within the enlarged bore portion of the fingerless base. A bore of a sleeve is received onto the tubular adjacent the fingers, and a packing member is received on the tubular adjacent a packer face of the base opposite the enlarged bore portion (not shown in FIG. 12).

FIG. 13 is a perspective view of a stop collar formed by installing the bore of the sleeve onto the fingers of FIG. 12.

FIG. 16 illustrates an embodiment of a method of assembling the fingers and the fingerless base of FIG. 12 for subsequent installation of a sleeve received on the tubular adjacent the base.

FIG. 17 further illustrates the method of installing a stop collar with a base assembled using the step illustrated in FIG. 16.

FIG. 19 is a section view of a fingerless base having a groove in a face to receive at least a portion of a set of separate fingers (not shown). FIG. 19A is an enlarged view of a part of FIG. 20 illustrating the groove in the face.

FIG. 20 is a section view of a fingerless base having an enlarged bore portion adjacent a face to receive at least a portion of a set of separate fingers (not shown) to a seated position within the enlarged bore portion. FIG. 20A is an enlarged view of a part of FIG. 20 illustrating the enlarged bore portion.

FIG. 21 is a section view of a fingerless base having a backing face forming a non-perpendicular angle with an end of the base. FIG. 21A is an enlarged view of a part of FIG. 21 illustrating the shape of the backing face.

FIG. 22 is a perspective view of a stop collar installed using the method illustrated in FIGS. 12-17 to secure a centralizer on a tubular. The fingerless base used to form the stop collar is integrally formed with an end collar of a bow-spring centralizer.

FIG. 23 is an embodiment of a single finger comprising a strip of material rolled into a generally cylindrical shape with a slot separating the ends of the strip one from the other. The single finger is illustrated as received on a tubular (in dotted outline) adjacent a bore of a sleeve also received on the tubular.

FIG. 24 is an embodiment of a stop collar formed by receiving the sleeve of FIG. 23 onto a portion of the single finger in an interference-fit to form a stop collar.

FIG. 26A is an elevation view of a bow-spring centralizer received in a floating mode between two stop collars on a tubular in a deployed configuration and movable within a range intermediate a pair of straddling stop collars of the embodiment illustrated in FIG. 5.

FIG. 26B is an elevation view of the bow-spring centralizer of FIG. 26A movable within a range intermediate a stop collar of the embodiment illustrated in FIG. 5 and a tubular connection.

FIG. 27 is an elevation view of the bow-spring centralizer and tubular of FIG. 26A disposed within a restricted portion of a bore.

FIG. 28 is a perspective view of an embodiment of a stop collar installation tool having a first bolt and a second bolt to together force the bore of a sleeve received on a tubular onto a set of fingers extending toward the sleeve from an adjacent base received on the tubular.

DETAILED DESCRIPTION OF EMBODIMENTS

Figure 1A:
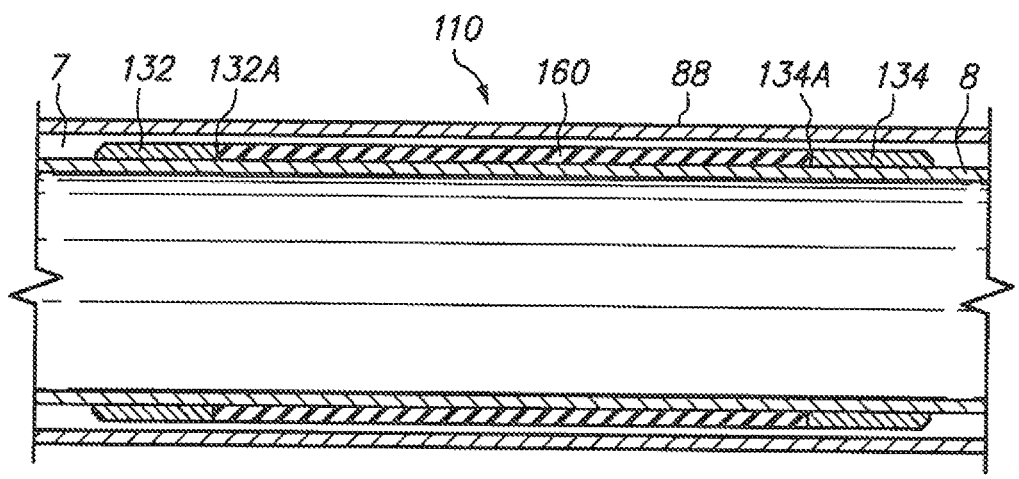
FIG. 1A is schematic of a packer comprising an expandable packing member received on a tubular between straddling stop collars.

FIG. 3 is a perspective view of a base 12 (e.g., tubular base) that may be used to form one embodiment of a stop collar, the base 12 having a bore to receive a tubular 8 and a set of fingers 16 extending from the base 12. The depicted fingers 16 of the base 12 extend in a first direction along the exterior 8A of the tubular 8, and the depicted fingers 16 are angularly distributed about the base 12 and separate by a plurality of slots 17. Base 12 may comprise a gap 15 to allow variation of the diameter of the bore of the base 12, e.g., by elastic deformation of the base 12 to close or open the gap 15. Base 12 may comprise a stop wall 13 to limit the extent to which a sleeve may be received onto the fingers 16. Fingers 16 may be coextensive, e.g., in axial length of extension from the base 12. Fingers 16 may comprise a taper (not shown) along their length or along a portion the length of extension from the base 12, and/or the fingers 16 may comprise a bevel 19 to engage and guide a sleeve (not shown—see FIG. 4) to a received position around the fingers 16.

FIG. 4 is a perspective view of the base 12 of FIG. 3 after the bore of a sleeve 32 is received onto a tubular 8 and an optional clamp 20 is applied to secure the base 12 in a position on the tubular 8. A bore of a sleeve 32 received onto the tubular 8 is depicted as adjacent the fingers 16 extending from the base 12. The depicted clamp 20 comprises a fastener 29 having a head 22 adapted for being engaged and turned by a tool (not shown) and a nut 26 threadably received on a shaft 24, although other types of clamps or similar devices may be used without departing from the spirit of the invention. Depicted retainer channels 27 and 28 receive the shaft 24 so that the clamp 20 may be opened or closed by rotation of the head 22 of the fastener 29 using a tool (not shown). In one embodiment, once the clamp 20 is applied to secure the base 12 in position on the tubular 8 as shown in FIG. 4, the base 12 the sleeve 32 may be received onto the fingers 16.

Clamping of the base 12 is optional, and the base 12 may, in lieu of or in addition to the application of a clamp, be secured in position on the tubular 8 by, for example, but not by way of limitation, elastically expanding the base 12 by enlarging the gap 15 and then positioning the expanded base 12 on the tubular 8 so that it will grip the tubular 8 upon release from the expanded condition. Additionally or alternately, a sleeve hammer, e.g., one of substantial mass, may be disposed on the tubular 8 adjacent the base 12 to back-up the base 12 and restrict movement of the base 12 along the tubular 8 and away from the sleeve 32. Other methods of and structures for limiting or preventing movement of the base 12 along the tubular 8 may be used, and are within the scope of the appended claims. A sleeve hammer may be used to strike end 38 of the sleeve 32 to drive the sleeve 32 onto the fingers 16 to install the stop collar. Additionally or alternately, a machine, for example, but not by way of limitation, an installation tool (e.g., in FIGS. 28-31F) may be used to dispose the sleeve 32 onto the fingers 16 extending from the base 12 while also applying a generally equal and opposite reaction force to the base 12.

FIG. 5 is a perspective view of one embodiment of a stop collar 10 formed by disposing the bore of the sleeve 32 onto the fingers 16 (not shown in FIG. 5—see FIG. 4) extending from the base 12 of FIG. 4. Using a tool, such as a sleeve hammer, an installation tool or other implement, the sleeve 32 is moved from the position shown in FIG. 4 onto the fingers 16 in an interference-fit. The sleeve 32 may be guided into a position on the fingers 16 by an optional bevel 19 (e.g., FIG. 4). Stop collar 10 may securely grip the tubular 8 with the sleeve 32 received on only a portion of the fingers 16, or the sleeve 32 may be received along the full extension of the fingers 16 to an abutting position with the stop wall 13 as shown in FIG. 5.

Optionally, as illustrated in the embodiment of the stop collar 10 in FIG. 4 (pre-assembly) and FIG. 5 (post-assembly), the width of the sleeve 32 may be greater, in a direction along the axis of the tubular 8, than the length of extension of the fingers 16 from the base 12. In this configuration, the fingers 16 (concealed by the sleeve 32 in FIG. 5) do not extend along the tubular 8 the full width of the bore of the installed sleeve 32, and a portion of the sleeve 32 received onto the fingers 16 may elastically expand to an outer diameter greater than an adjacent portion of the sleeve 32 that lies beyond the extension of the fingers 16. This may result in a transition ridge 36 at which the sleeve 32 begins to taper, as shown in FIG. 5 and FIG. 7, imparting a "bullet-nosed" or tapered portion 39 adjacent an end 38 of the assembled stop collar 10. The optional taper may facilitate movement of the stop collar during through restrictions. In one embodiment of a method of installing a stop collar, the sleeve 32 may be disposed toward a leading end of a tubular (e.g., toward an end of the tubular to be first into a bore). As a result, any friction on, and impacts to, the sleeve 32 tends to urge the sleeve 32 toward an installed configuration on the fingers 16 as opposed to urging the sleeve 32 towards removal from the fingers 16.

FIG. 6 is a section view of the base member 12, the sleeve 32 and the tubular 8 of FIG. 4 showing one embodiment of the relative thicknesses and diameters of the base 12, the fingers 16 extending from the base 12, the sleeve 32 and the wall 8A of the tubular 8. The clamp 20 (see FIG. 4) is omitted from the section view of FIG. 6 to better illustrate the relative thicknesses of the components of the illustrated embodiment of the stop collar. FIG. 6 illustrates one embodiment of the clearance between the sleeve 32 and the exterior 8A of the tubular 8 to receive the fingers 16 therewithin and an optional interior bevel 33 on an end 34 of the sleeve 32. The interior bevel 33 on the end 34 may, in one embodiment of a stop collar and of the method of installing a stop collar, be disposed to interact with the optional exterior bevel 19 on the fingers 16 to guide the sleeve 32 to a received position around the fingers 16, for example, as shown in FIG. 7.

FIG. 7 is a section view of FIG. 5 showing the assembled stop collar 10 comprising the base 12, and the sleeve 32 received onto the fingers 16 extending from the base 12 in an interference-fit to capture the fingers 16 between the sleeve 32 and the exterior 8A of the tubular 8. FIG. 7 illustrates the tapered portion 39 of the depicted sleeve 32 between a transition ridge 36 and the end 38 of the sleeve 32. In other embodiments, the one or more fingers 16 may extend a length equal to the width of the sleeve 32 or beyond the width of the sleeve 32, thereby producing no tapered portion 39.

Dimensions of the various components and structures may vary, and these may be optimized according to the specific application and the specific materials employed. In one embodiment, for example, and not by way of limitation, for a stop collar 10 to be installed on a tubular 8 having a P.O.D. of 20.3 cm (8.0 inches), the sleeve 32 may comprise a bore of 20.45 cm (8.05 inches), an axial width of 5.1 cm (2.0 inches) and a radial thickness of 0.35 cm (0.14 inches), as may be shown in FIG. 5. The base 12 to be used with the sleeve 32 may comprise a base 12 having a bore of 20.45 cm (8.05 inches) and a width of 2.54 cm (1.00 inch) from which a plurality of fingers 16 extend a distance of 3.81 cm (1.50 inches) in a first direction, for example, as shown in FIG. 5. The radial thickness of the fingers 16 may be 0.13 cm (0.05 inches), and the width of the slots 17 intermediate the fingers 16 may be 0.645 cm (0.250 inch). These are merely examples of dimensions in one specific embodiment of an interference-fit stop collar, and should not be limiting of the dimensions and structures that may be within the disclosure or the appended claims. The number of fingers that may be disposed on the base 12 may also vary, including only a single finger, and the number of fingers 16 extending from the base 12 illustrated in the appended drawings is merely an example, and should not be deemed as limiting.

FIG. 8 is a perspective view of an alternate embodiment of a base 42 with a first plurality of fingers 46A extending in a first direction and a second plurality of fingers 46B extending in a second and opposite direction, the base 42 having a bore intermediate the first plurality of fingers 46A and the second plurality of fingers 46B to receive a tubular 8. FIG. 8 illustrates how the base 42 may be coupled in a position on the tubular 8 using a clamp 20 and the bores of a first sleeve 32A and a second sleeve 32B may be received onto the tubular 8 adjacent to the first plurality of fingers 46A and the second plurality of fingers 46B. Once the clamp 20 is applied to couple the base 42 in a targeted position on the tubular 8, for example, as shown in FIG. 8, the base 42 may receive the first sleeve 32A and the second sleeve 32B onto the first plurality of fingers 46A and the second plurality of fingers 46B, respectively, to form the stop collar 50 shown in FIG. 9.

FIG. 9 illustrates the first and second sets of fingers 46A and 46B extending a length less than the width of the corresponding sleeves 32A and 32B received thereon, respectively, and the resulting stop collar 50 comprises two generally tapered portions 39A and 39B to provide a self-tightening grip at each end of the stop collar 50 as described above in reference to the tapered portion 39 shown in FIG. 5. As a result, in addition to providing a substantial increase in load capacity obtained by the favorable grip area, the stop collar of FIG. 9 may be self-tightening upon friction or impact to either of the sleeves 32A and 32B of the stop collar 50 in either direction along the axis of the tubular 8.

Figure 10:
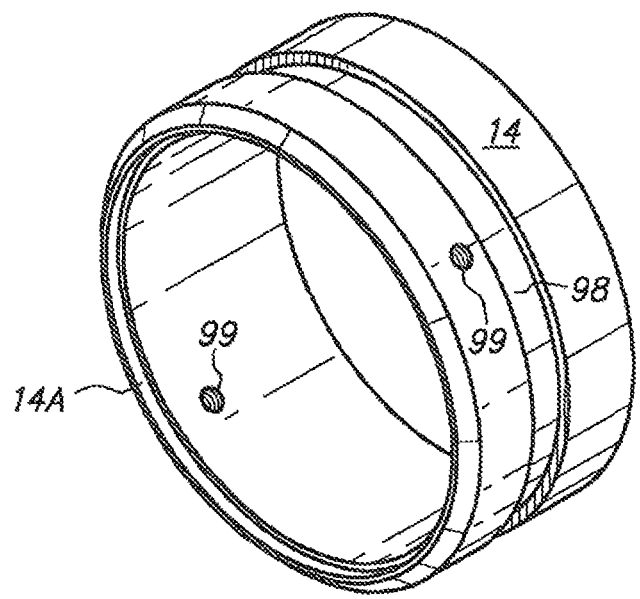
FIG. 10 is a perspective view of an embodiment of a fingerless base having an enlarged bore portion that may be used to form an alternative embodiment of a stop collar.

FIG. 10 is a perspective view of a component of an alternate embodiment of the stop collar having a fingerless base 14 with an enlarged bore portion 14A therein for cooperating with separate fingers. Optionally, the fingerless base 14 may comprise a recess 98 therein to facilitate handling and/or for receiving a tool, as described below in connection with FIGS. 28-31F. The fingerless base 14 illustrated in FIG. 10 further comprises a packer face 15 (not visible in FIG. 10—see FIG. 15-18). Optionally, the fingerless base 14 may comprise one or more set screws 99 to secure the fingerless base 14 in a position on a tubular (not shown in FIG. 10) for installation.

Figure 11:
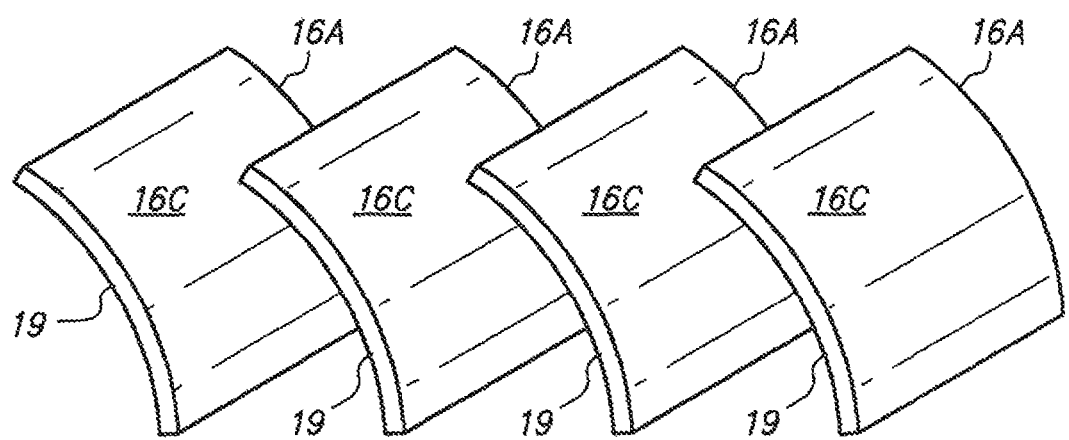
FIG. 11 is a perspective view of a set of (four) separate fingers having a curvature generally conforming to the enlarged bore portion of FIG. 10.

FIG. 11 is a perspective view of an embodiment of a set of (separate) fingers 16A that may be assembled with the fingerless base 14 of FIG. 10 and a sleeve (not shown in FIGS. 10 and 11—see element number 32 in FIGS. 12 and 13) to form an embodiment of a stop collar. The separate fingers 16A illustrated in FIG. 11 comprise an exterior surface 16C and an optional beveled edge 19. An embodiment of separate fingers may comprise fingers linked or flexibly linked, for example, in pairs, subsets or sets.

FIG. 12 is a perspective view of the fingerless base 14 of FIG. 10 received on a tubular 8 with a portion of the separate fingers 16A of FIG. 11 received within the enlarged bore portion 14A to form a base 12, and a bore of a sleeve 32 received on the tubular 8 adjacent the fingers 16A. An optional packing member 160 is received on the tubular 8 adjacent a packer face 15 of the base 12.

FIG. 13 is a perspective view of the base 12 of FIG. 12 after the sleeve 32 is received onto the fingers 16A (not shown in FIG. 13—see FIG. 12) to form a stop collar 10 to restrict movement of the packing member 160 disposed adjacent the packer face 15. Upon installation of the sleeve 32 onto the fingers, the fingers are together displaced radially inwardly to grip the tubular 8 over a grip area, and the fingers are captured between the sleeve 32 and the tubular 8 in an interference-fit.

Figure 14:
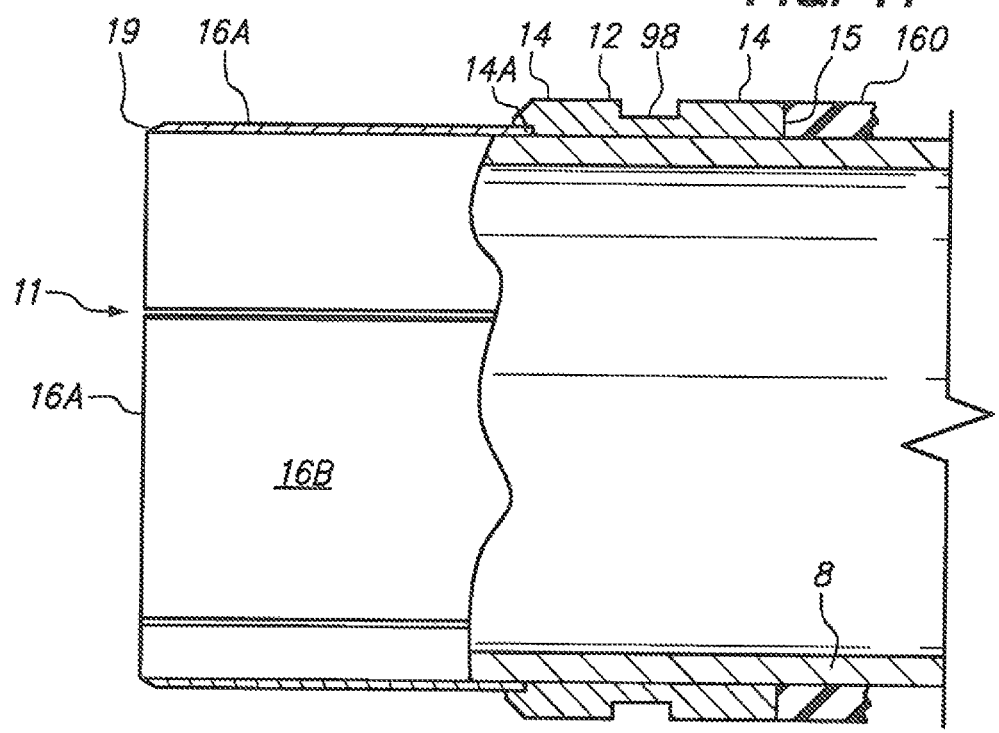
FIG. 14 is a section view of the fingerless base, fingers and the tubular of FIG. 12 taken along the line 14-14. A portion of the tubular wall is removed to reveal the interior surfaces of the fingers.

FIG. 14 is a section view of FIG. 12 showing the relative thicknesses of one embodiment of stop collar components. The base 12 comprises a packer face 15 engaging the packing member 160, the set of fingers 16A. FIG. 14 reveals an interface between a portion of the fingers 16A and the enlarged bore portion 14A within the bore of the base 12 that will be discussed below in connection with FIGS. 15-17, 20 and 20A. A portion of the tubular 8 is removed to reveal interior surfaces 16B of the fingers 16A of the base 12.

Figure 1B:
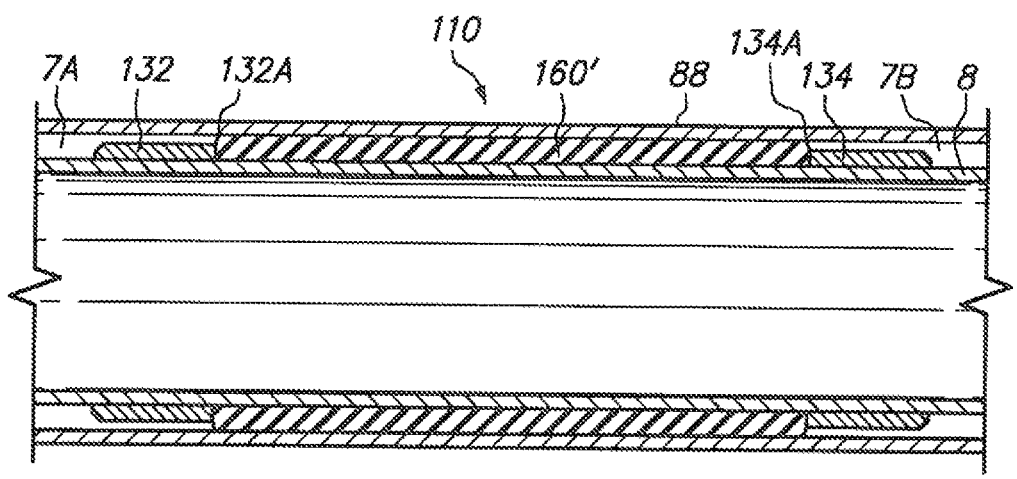
FIG. 1B is the schematic of FIG. 1A after expansion of the packing member to isolate an annulus first portion from an annulus second portion.
Figure 2:
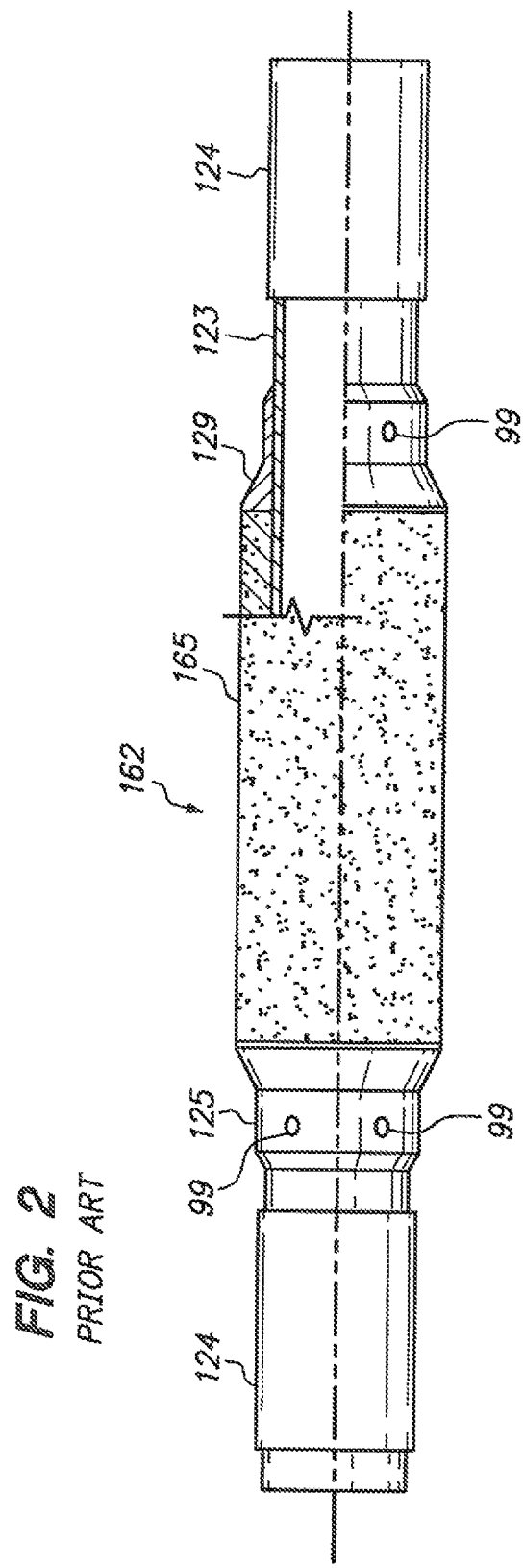
FIG. 2 is a schematic of an expandable packer in the retracted mode mounted on a mandrel having internally threaded connections at the ends for connection between adjacent tubular segments of a tubular string.
Figure 15:
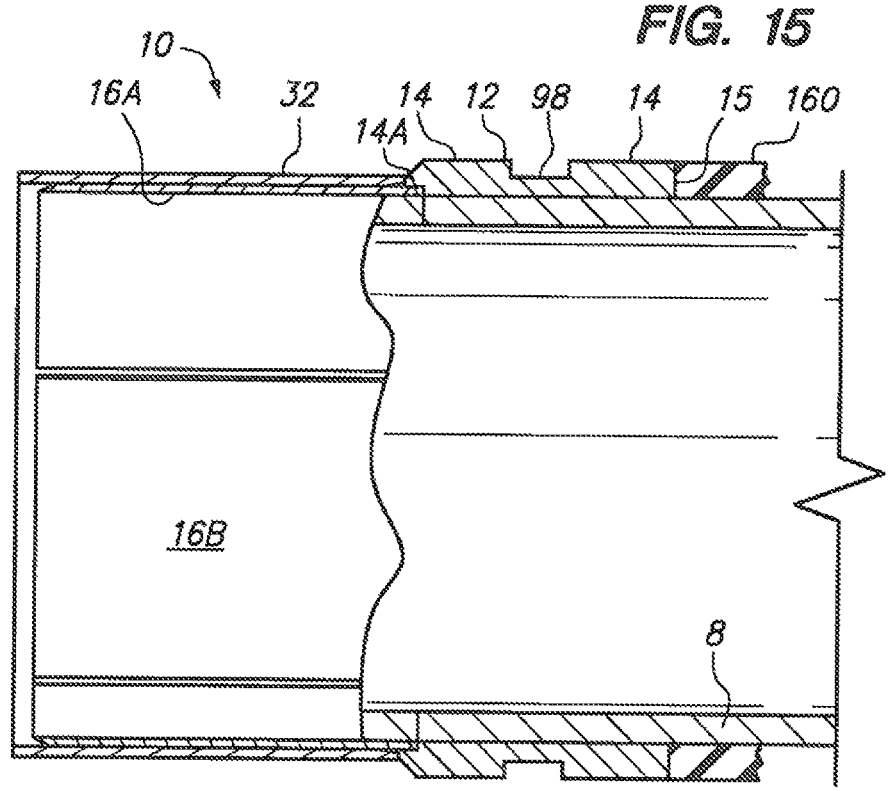
FIG. 15 is a section view of the installed stop collar of FIG. 13 taken along the line 13-13. A portion of the tubular wall is removed to reveal the interior surfaces of the fingers.

FIG. 15 is a section view of the assembled stop collar 10 of FIG. 13 installed on a tubular 8 to secure the packer face 15 against movement. Stop collar 10 may prevent or limit movement of the packing member 160 due to frictional contact of the packing member 160, e.g., with a bore through which the tubular 8 may move. The stop collar 10 may also secure the packing member 160 against axial expansion (along the tubular 8) and against movement along the tubular 8 when acted upon by a pressure differential applied across an expanded packing member (see, for example, FIG. 1B). A portion of the tubular is depicted as removed to reveal the interior surfaces 16B of the fingers 16A of the base 12.

FIG. 16 is a section view illustrating an alternative embodiment of a method of securing a stop collar on a tubular. In a first step, e.g., illustrated by FIG. 16, a fingerless base 14 is received on a tubular 8 adjacent an optional packing member 160. In a second step, a sleeve 32 is received on the tubular 8 adjacent an enlarged bore portion 14A of the fingerless base 14. In a third step, a set of (one or more) separate fingers 16A are moved radially inwardly from a removed position illustrated in FIG. 16 to a position intermediate the sleeve 32 and the enlarged bore portion 14A of the fingerless base 14, as indicated by the arrows 17.

FIG. 17 illustrates a fourth step in which the set of separate fingers 16A are received into the enlarged bore portion 14A of the fingerless base 14 to form a base 12, and a fifth step in which the sleeve 32 is received onto the fingers 16A of the base 12 to form a stop collar 10 to limit or prevent movement of at least a portion of a packing member 160. In one aspect, the method illustrated in FIGS. 16 and 17 enables more efficient storage, packing and shipment of stop collar components, and the stop collar may be assembled using a varying number of separate fingers which may be removed, arranged and/or easily repositioned within the enlarged bore portion to accommodate tubular outer diameter.

Figure 18:
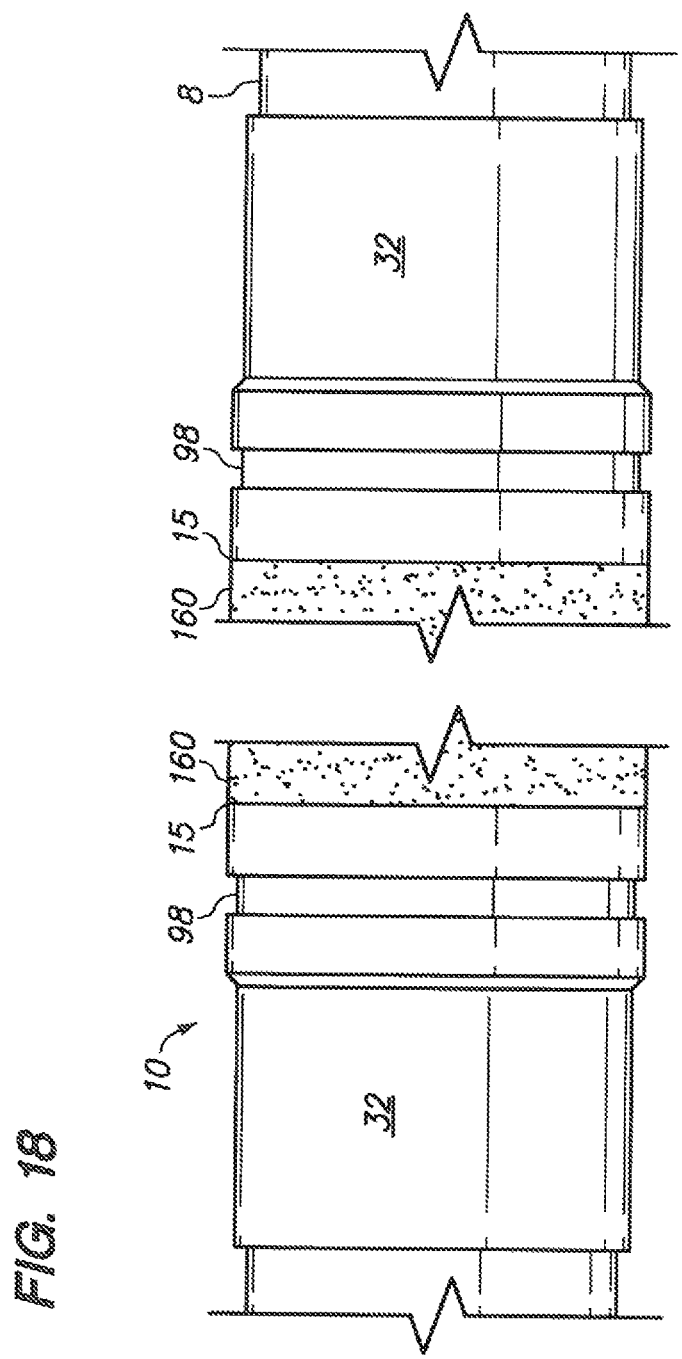
FIG. 18 is an elevation view of a packing member straddled by stop collars that may be assembled using the methods illustrated in FIGS. 12-17.

FIG. 18 is an elevation view of a packing member 160 straddled by a pair of stop collars 10 secured to a tubular 8 and formed using the method illustrated in FIGS. 16 and 17.

FIG. 19 is a section view of an alternative fingerless base 14 having a groove 12A formed in a face of the fingerless base 14 for receiving at least a portion of a set of (one or more) separate fingers (not shown in FIG. 19—see FIG. 11). FIG. 19A is an enlarged view of part of FIG. 19 illustrating the groove 12A in the first portion 14 to receive one or more fingers (not shown) therein.

FIG. 20 is a section view of the type of fingerless base 14 illustrated in FIGS. 16 and 17 and having an enlarged bore portion 14A, e.g., to a recess, to receive at least a portion of the set of (one or more) separate fingers 16A (not shown in FIG. 20—see FIG. 17). FIG. 20A is an enlarged view of part of the fingerless base 14 of FIG. 20 illustrating the enlarged bore portion 14A to receive a set of (one or more) separate fingers (not shown) in a seated position therein (see FIG. 17). The diameter of the enlarged bore portion 14A may be generally equal to the diameter of the bore of the fingerless base 14 plus twice the thickness of the separate fingers (not shown in FIG. 20—see FIGS. 11 and 17).

FIG. 21 is a section view of an alternate embodiment of a fingerless base 14 having a backing face 12C thereon to abut at least a portion of one or more separate fingers (not shown). FIG. 21A is an enlarged view of a portion of FIG. 21 illustrating the shape of the backing face 12C.

FIG. 22 is a perspective view of a stop collar 10 with a fingerless base 14 is integrally formed with a plurality of bow-springs 25. While the bow-springs are shown as integrally formed in FIG. 22, the bow-springs may also be coupled to the fingerless base 14 by welding, fasteners, threads or other known methods for connecting mechanical structures. The fingerless base 14, like the base 12 having fingers thereon and illustrated in FIG. 3, may be integrally formed or connected to components of packers (see FIGS. 12-18), centralizers (see FIG. 22), and other devices including, but not limited to, wipers, scratchers, landing collars, etc. The embodiment of the stop collar depicted in FIGS. 1-7 may also be formed integrally with or connected to components of packers (in place of the embodiment of the stop collar depicted in FIGS. 12-18), centralizers (instead of the embodiment of the stop collar depicted in FIG. 22), and other devices including, but not limited to, wipers, scratchers, landing collars, etc., and the illustrations are not limiting of the embodiments of the stop collar that may be used in connection with various devices.

FIG. 23 is an alternative embodiment of a single finger 31 comprising a generally cylindrical sleeve having a slot 31A separating two ends one from the other. The single finger 31 is illustrated as received on a tubular 8 (in dotted outline) adjacent a bore of a sleeve 32 received on the tubular 8 adjacent the single finger 31.

FIG. 24 is an alternative embodiment of a stop collar 10 formed by receiving the sleeve 32 of FIG. 23 onto a portion of the single finger 31 to capture the single finger 31 between the bore of the sleeve 32 and the tubular 8 in an interference-fit. The tubular 8 is shown in dotted lines in FIGS. 23 and 24 to better reveal the structure of the single finger 31 and the interaction between the sleeve 32, the single finger 31 and the tubular 8. The single finger 31 can, in one embodiment, span the full 360 degrees around the tubular 8.

Figure 25A:
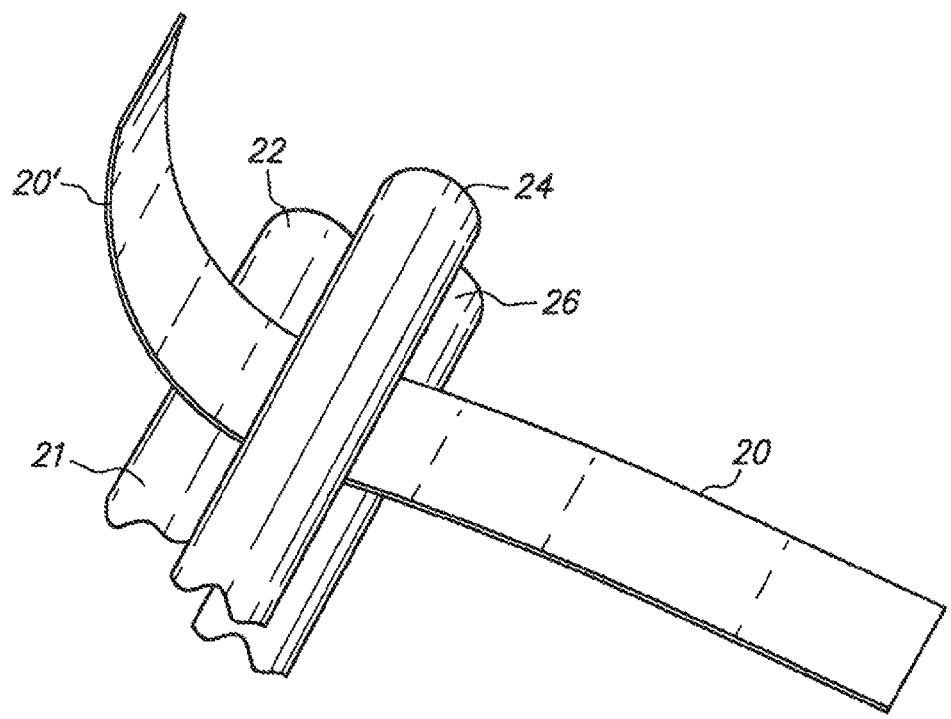
FIGS. 25A-25C illustrate the steps of a method of forming the single finger of FIGS. 23 and 24 using a sheet metal roller and a strip of sheet metal.
Figure 25B:
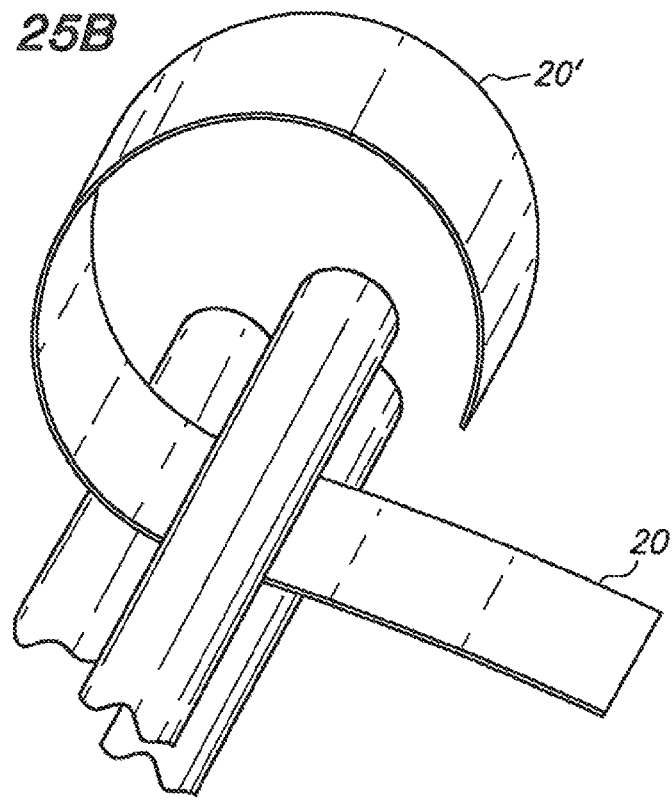
Figure 25C:
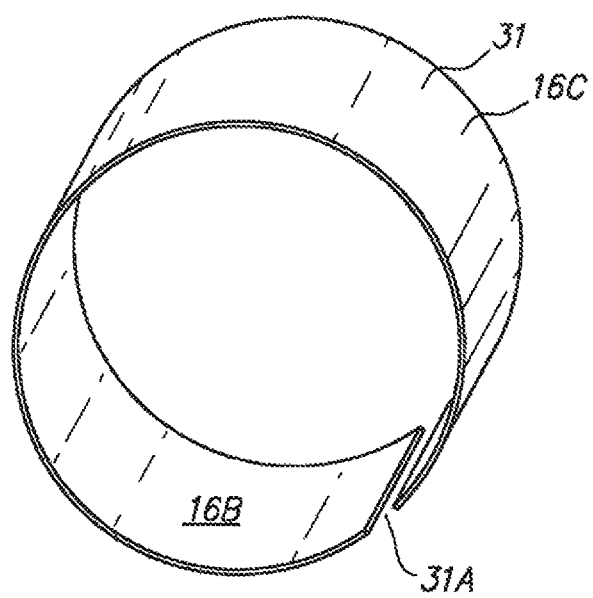

FIGS. 25A-25C illustrate the steps of one method of forming a single finger 31 of the stop collar 10, e.g., of FIG. 24 using a sheet metal roller to shape an elongate strip of sheet metal 20. The sheet metal roller 21 illustrated in FIGS. 25A-25C comprises a set of three adjacent rollers 22, 24 and 26. FIG. 25A shows the initial bending of an elongate strip 20 of sheet metal fed into the sheet metal roller 21 set to the desired bending radius. FIG. 25B illustrates the final phase of shaping of the finger, and FIG. 25C illustrates the finished single finger 31 comprising an interior surface 16B to engage the tubular 8, an exterior surface 16C to engage the sleeve (not shown—see FIG. 24) and a slot 31A to allow the single finger 31 to conform to the outer diameter and/or any diameter variation of the tubular 8 on which the stop collar 10 of FIG. 24 is to be installed.

In one method, the separate fingers illustrated in FIG. 11 may be made by cutting the single finger 31 of FIG. 25C along planes intersecting the axis of the cylinder formed by the single finger 31.

Another method of forming the single finger 31 of FIG. 25C comprises the steps of cutting a tubular in a first plane perpendicular to the axis of the tubular and again cutting the tubular in a second plane perpendicular to the axis of the tubular and parallel to the first plane to provide a truncated tubular, and then cutting a strip from the wall of the truncated tubular parallel to the axis of the truncated tubular to provide a single finger for use in forming a stop collar. The inner diameter and/or the outer diameter of the single finger may be machined to provide for desired thickness and/or shape of the single finger to optimize the interference-fit to be obtained upon installation of the sleeve to form the stop collar.

FIG. 26A is an elevation view of a bow spring centralizer 80 received on a tubular 8 in a deployed configuration and movable within a range intermediate a pair of stop collars 10 of an embodiment of the stop collar, e.g., the embodiment illustrated in FIG. 5. The bow spring centralizer 80 and the tubular 8 are illustrated as disposed within the bore of a casing 70. It should be noted that the separation of the pair of stop collars 10 in FIG. 26A provides a gap 84 between a second end collar 82B of the centralizer 80 and one of the pair of stop collars 10 when the first end collar 82A is adjacent the other of the pair of stop collars 10. The gap 84 may provide space for further separation of the first end collar 82A from the second end collar 82B upon collapse of the bow springs to lie substantially flat along the tubular 8, e.g., during running in or out of the hole.

FIG. 26B is an elevation view of the bow spring centralizer 80 of FIG. 26A movable within a range intermediate a stop collar 10 of an embodiment of the stop collar, e.g., the embodiment illustrated in FIG. 5, and a tubular connection 90 joining adjacent tubular segments. FIG. 26B illustrates how the stop collar 10 may be used in conjunction with tubular connections 90 on tubular strings having a non-flush (on the exterior of the tubular string) connection to position devices, such as centralizers, within a targeted range of movement.

FIG. 27 is an elevation view of the bow spring centralizer 80' and tubular 8 of FIG. 26A disposed within a restricted portion 71 of a borehole encased within a cement liner 72. The bow spring centralizer 80' and the tubular 8 are illustrated in a configuration that would result from movement through the restricted portion 71 in the direction shown by arrow 73. The bow spring centralizer 80' is illustrated in FIG. 27 in a collapsed configuration with the bow springs 87 collapsed to lie substantially flat along the tubular 8. The gap 84' is narrowed from its configuration shown in FIG. 26A due to the separation of the end collars 82A and 82B of the bow spring centralizer as the bow springs 87 are collapsed to lie along the tubular 8. The bow springs 87 of the bow spring centralizer 80' shown in FIG. 27 are biased against the interior 71A of the wall of the restricted portion 71 of the borehole, resulting in increased frictional resistance to movement on the bow spring centralizer 80' that is opposed by reactive force provided by the trailing stop collar 10 abutting the trailing end collar 82A of the bow-spring centralizer 80'.

Embodiments of the stop collar may be combined with, coupled to and/or integrally formed with one or more other structures to be coupled to or disposed on a tubular without impairment of the function of the stop collar. For example, but not by way of limitation, for a bow spring centralizer having end collars, at least one end collar may comprise an extendable collar like the embodiments disclosed in U.S. Publication 2008/0283237 of Buytaert et al., assigned to the assignee of this application.

Embodiments of the stop collar may be used to prevent or limit the movement of devices other than a bow spring centralizer, and the use of embodiments of the stop collar to prevent or limit movement of a bow spring centralizer is merely an example. Embodiments of the stop collar may be used to prevent or limit the movement of wear bands, torque reducers, scrapers, stabilizers and/or other devices may be made up into a tubular string as it is run into a drilled borehole.

In an embodiment of the method disclosed herein, an installation tool may be used to install a sleeve onto a set of one or more fingers to install a stop collar on a tubular. An installation tool may include manual components, such as an indexing jack, a threaded shaft, a ratchet or other device for providing mechanical leverage. Additionally or alternatively, an installation tool may comprise an actuator such as, for example, hydraulic or pneumatic cylinders or a powered jack.

For example, but not by way of limitation, FIG. 28 is a perspective view of an installation tool comprising a first bolt 191 and a second bolt 193 used, as illustrated in FIG. 28, as simple screw jacks to force the sleeve 38 onto the fingers 16 extending from an adjacent base 12 to capture the fingers 16 between the sleeve 38 and the tubular 8. The screw jacks illustrated in FIG. 28 comprise first and second bolts 191 and 193 with threaded portions 166 and 167, respectively. The bolts 191 and 193 receive nuts 192A and 194A, respectively. First bolt 191 is depicted as received through aperture 165A to dispose the head 191A against ear 162A of the first body 62, and the threaded portion 166 of the first bolt 191 is depicted as received through aligned aperture 165B on second ear 168A to receive the nut 192A to couple the threaded portion 166 to the second ear 168A of the second body 64. A second bolt 193 is depicted as received through aperture 164A to dispose the head 193A against ear 162B of the first body 62, and the second bolt 193 is depicted as received through aligned aperture 164B to receive the nut 194A to couple the threaded portion 167 to the second ear 168B. Simultaneous or staggered rotation of nuts 192A and 194A on the threaded portions 166 and 167 of first bolt 191 and second bolt 193, respectively, moves the installation tool from an elongated position to a retracted position to advance the second body 64 in the direction of arrow 3 onto the fingers 16 to install the stop collar.

Figure 29:
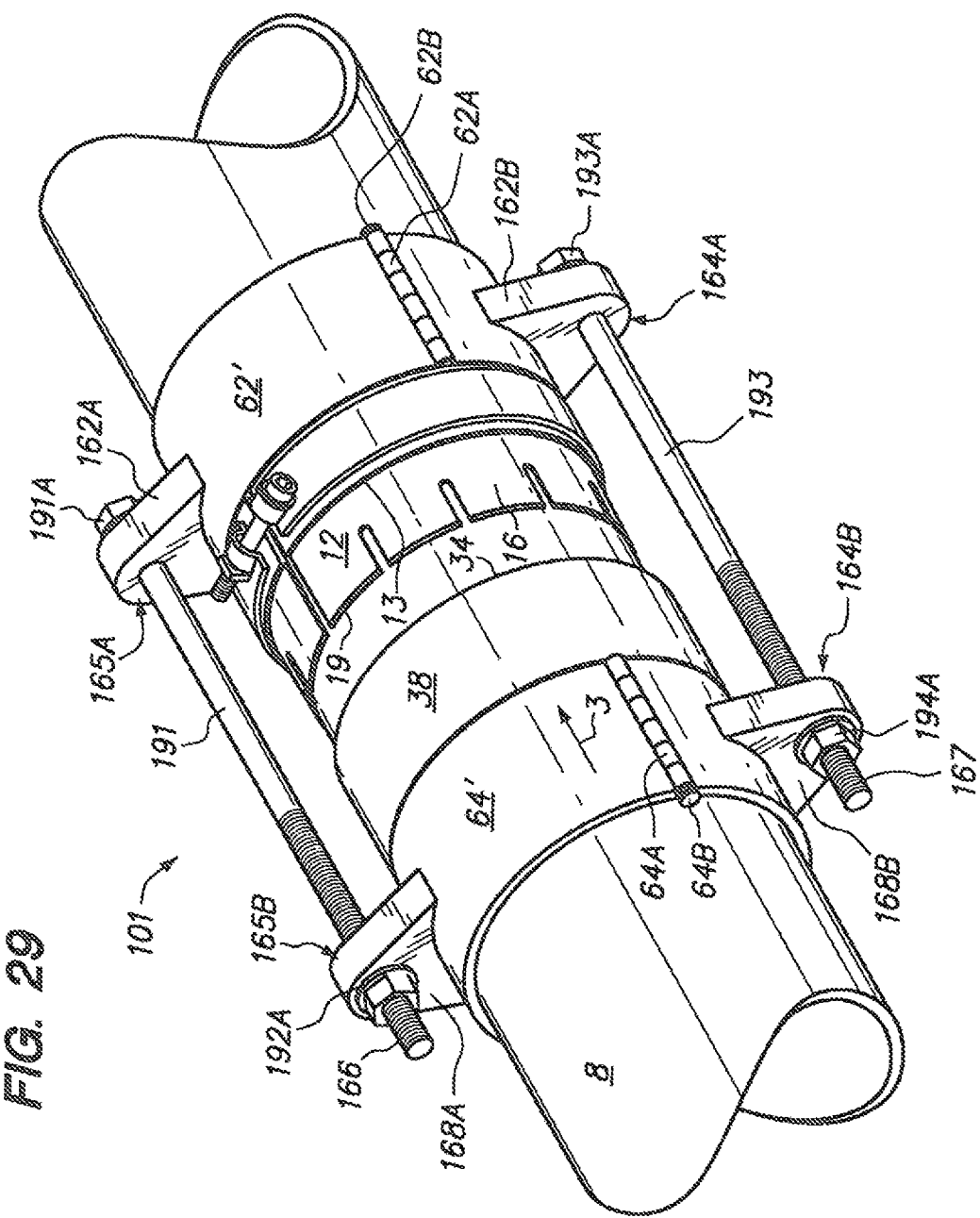
FIG. 29 is a perspective view of an alternate embodiment of the installation tool of FIG. 28 having a first hinged body and a second hinged body to facilitate installing the installation tool on and removing the installation tool from the tubular, respectively.

FIG. 29 is a perspective view of an alternate embodiment 101 of an installation tool having a first hinged body 62' and a second hinged body 64' to facilitate installation of the tool on, and removal of the tool from, the tubular 8. Using the hinged bodies 62' and 64', the installation tool 102 illustrated in FIG. 29 is, after installation, generally similar to the installation tool 101 illustrated in FIG. 28 except that the first body 62' and the second body 64' each comprise semi-circular portions coupled using hinges 62A and 64A (opposing hinges on each of first body 62' and the second body 64' hidden from view in FIG. 29 by tubular 8) to facilitate opening of the first body 62' and the second body 64' for removal and closing of the first body 62' and the second body 64' for installation (as shown in FIG. 29). The installation tool 101 illustrated in the installed mode in FIG. 29 may be removed from the tubular 8 by removal of pins 62B and 64B from hinges 62A and 64A to open the hinges. Additionally or alternately, the first and or second bodies 62' and 64' may be secured in the closed position around the tubular 8 using a clamp or latch instead of with a pinned hinge.

Figure 30:
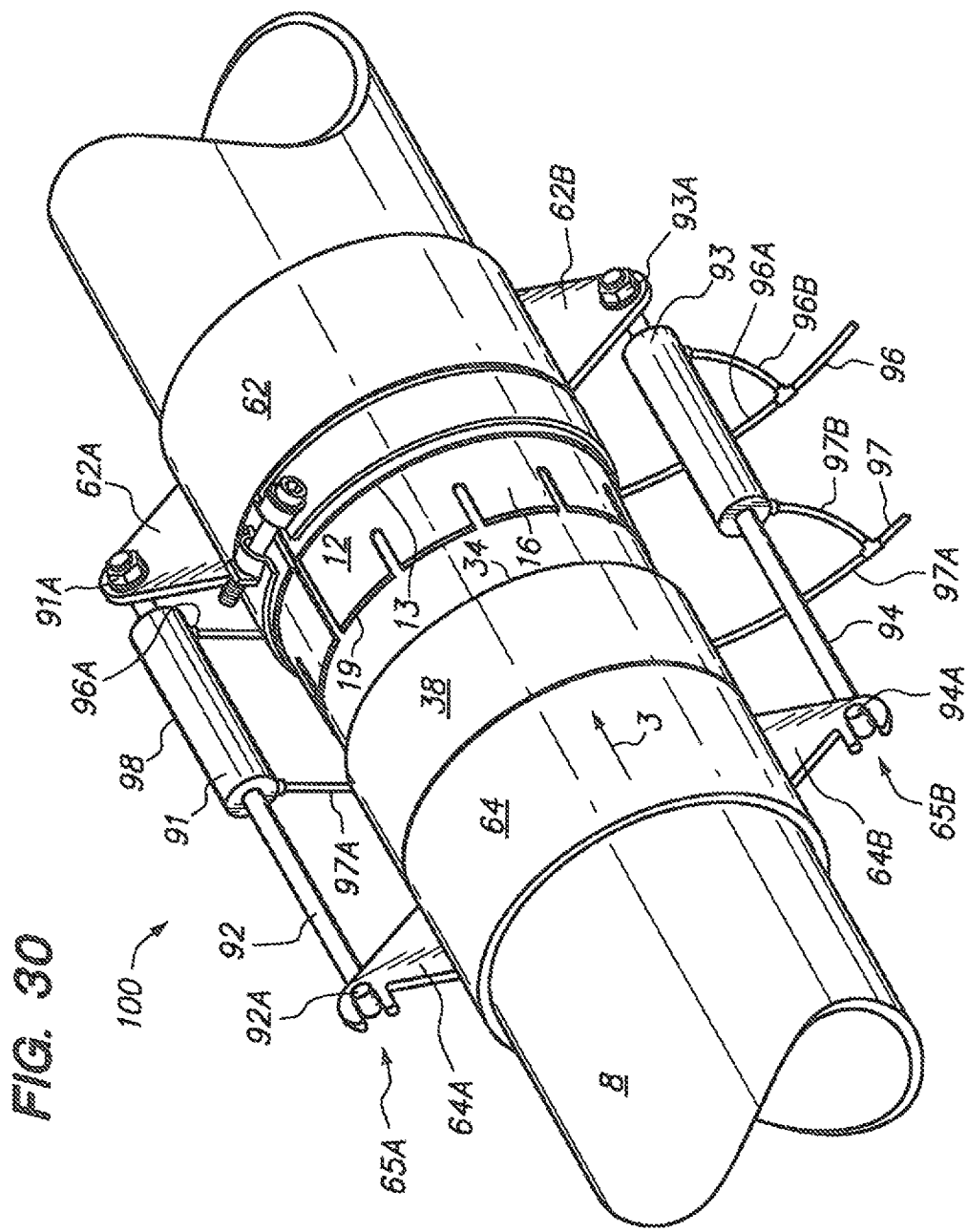
FIG. 30 is a perspective view of an alternative embodiment of a stop collar installation tool having a first fluid cylinder and a second fluid cylinder to together force the bore of a sleeve received on a tubular onto the set of fingers extending toward the sleeve from an adjacent base received on the tubular.

FIG. 30 is a perspective view of one embodiment of an installation tool 100 with a first fluid cylinder 91 and second fluid cylinder 93 to together forcibly install the bore of the sleeve 38 on the fingers 16 of adjacent base 12 to capture the fingers 16 between the sleeve 38 and the tubular string 8. The installation tool 100 comprises a first body 62 with a first ear 62A and a second ear 62B and received on the tubular 8 in a spaced-apart relationship to a second body 64 with a first ear 64A and a second ear 64B. Each of the first ear 64A and second ear 64B may comprise notches 65A and 65B, respectively, to receive hooks 92A and 94A of pull rods 92 and 94 extendable from the first and second fluid cylinders 91 and 93, respectively.

A supply of pressurized fluid may be provided to the first and second fluid cylinders 91 and 93 through supply lines 97, 97A and 97B, and fluid may be returned from the first and second cylinders to a fluid reservoir (not shown) through return lines 96, 96A and 96B. Upon receiving fluid through supply lines 97, 97A and 97B, the first and second fluid cylinders 91 and 93 will forcibly retract rods 92 and 94, respectively, to move the first and second fluid cylinders 91 and 93 from the elongated position to the retracted position to displace second body 64 in the direction of arrow 3 to dispose the sleeve 38 onto the fingers 16 of the base 12 to form a stop collar.

FIGS. 28-30 illustrate three embodiments of an installation tool for assembling embodiments of the stop collar, however it is noted that other embodiments of the installation tool may be devised wherein, for example, the force is applied to the bodies 62 and 64 using jacks having one or more worm gears, one or more indexed rails coupled to one or more ratchet mechanisms.

In all embodiments of methods of securing a stop collar to a tubular, the sleeve may be expanded from an original size to an expanded size by heating. Favorable materials, such as steel and other metal alloys, may be heated to substantially elevated temperatures using a variety of heat sources without substantial loss of desirable properties such as strength and toughness. For example, but not by way of limitation, the sleeve 32 in FIG. 4 may be heated to an expanded configuration using electrical resistance heating, electrical inductance heating, flame impingement, or other methods known in the art. The desired installation temperature to which the sleeve 32 may be heated depends on factors including, but not limited to, the original size of the sleeve 32, and the thermal expansion coefficient of the sleeve material, and the size and thickness of the fingers 16 extending from the base 12. In one embodiment of a stop collar with a steel sleeve 32 having a bore approximately equal in diameter to the bore defined within the fingers 16 extending from the base 12, the sleeve 32 may require heating to temperatures exceeding about 650° C.

(1,200° F.) to achieve an expanded size that can be received onto the fingers 16 extending from the base 12.

An embodiment of the stop collar may be assembled and an embodiment of the method may be used by heating the sleeve 32 prior to receiving the sleeve 32 on the tubular 8 to be coupled with the base 12, and/or the sleeve 32 may be heated, e.g., continually, as it is positioned along the length of the tubular 8 to the targeted position. For example, the sleeve 32 can be heated using electrical resistance even as the sleeve 32 is being positioned adjacent to the fingers 16 extending from the base 12.

In one embodiment, a handle (not shown in FIG. 4) may be attached (e.g., welded or otherwise temporarily coupled) to the sleeve 32 to facilitate personnel handling and positioning of the heated sleeve 32 along the tubular 8. The handle may simply be removed, e.g., broken off at the weld or coupling from the sleeve 32 after use, e.g., after it has contracted to grip the fingers 16 of the base 12.

While the first member of the embodiment of the stop collar illustrated in FIG. 4 may have a gap 15 to facilitate conformance of the base 12 to the exterior of the tubular 8, the sleeve 32 may have no gap (at least not a gap that extends across the entire width of the sleeve) and is, in the embodiment shown, a continuous structure about its bore. This configuration of the sleeve 32, which comprises a generally contiguous structure about the bore, enables the expanded sleeve 32 to contract by heat loss to the base 12 and forcibly capture the fingers 16 intermediate the contracting sleeve 32 and the exterior wall 8A of the tubular 8.

Figure 31A:
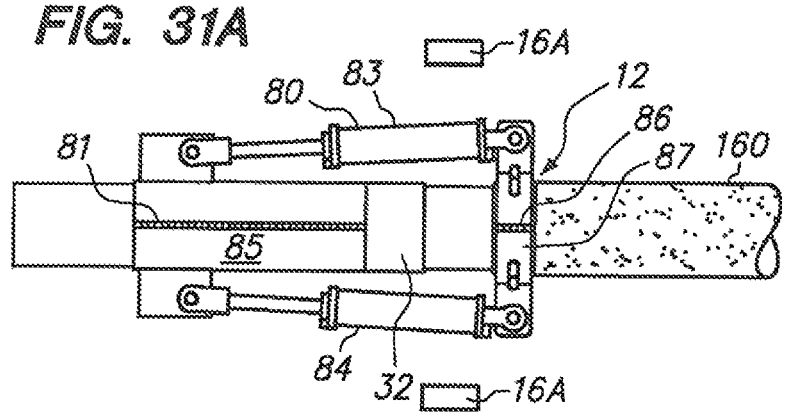
FIG. 31A is an elevation view of an embodiment of an installation tool having a first cylinder and a second cylinder to install the bore of a sleeve received on a tubular onto a set of fingers to be disposed to cooperate with an adjacent fingerless base received on the tubular. The fingers are not yet positioned for stop collar installation.

FIG. 31A is an elevation view of an embodiment of an installation tool 80 that may be used to install a sleeve 32 onto one or more fingers 16A of a base 12.

As illustrated in FIG. 31A, cylinders 83 and 84 are hingedly coupled (in an extended configuration) between to a first sleeve 85 and a second sleeve 87. The first sleeve 85 may comprise a hinge 81 and a latch (not shown) opposite the hinge 81, e.g., to enable the first sleeve to be installed about the tubular 8 to abut the finger sleeve 32 disposed proximate the fingers 16A of a base 12 on the tubular 8. The second sleeve 87 may also comprise a hinge 86 and a latch (not shown) opposite the hinge 86 to enable the second sleeve 87 to be installed about the base 12. Additionally or alternately, first sleeve 85 could be similar to second sleeve 87, e.g., it could have a spacer and/or adapter disposed intermediate the first sleeve 85 and sleeve 32 to provide an external coupling to sleeve 32 as opposed to an axially-aligned abutting configuration as illustrated in FIGS. 31A-31D.

The second sleeve 87 may couple to the base 12 (as illustrated below) to avoid damaging a packing member 160 received on the tubular 8 adjacent one of the stop collars. Actuation of the cylinders 83 and 84 from the extended mode (shown in FIG. 31A) to the retracted mode (shown in FIG. 31D) installs the finger sleeve 32 onto the fingers 16A in an interference-fit to form a stop collar 10 on the tubular 8.

Figure 31B:
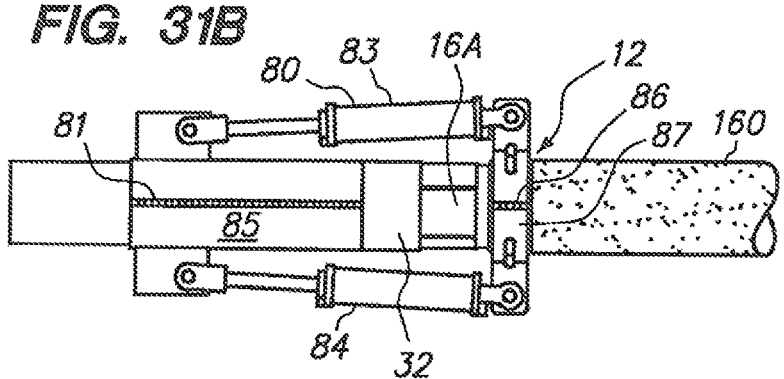
FIG. 31B is the installation tool of FIG. 31A after the set of fingers are positioned against the exterior of the tubular and between the fingerless base and the sleeve.
Figure 31C:
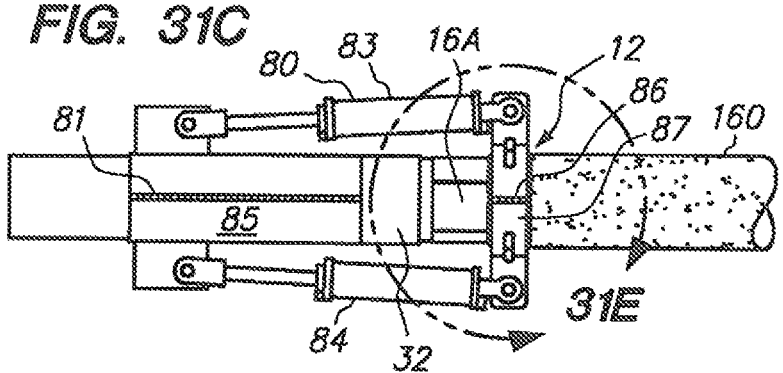
FIG. 31C is the installation tool of FIGS. 31A and 31B after at least a portion of the set of fingers are inserted into an enlarged bore portion (not shown) to form a base.
Figure 31D:
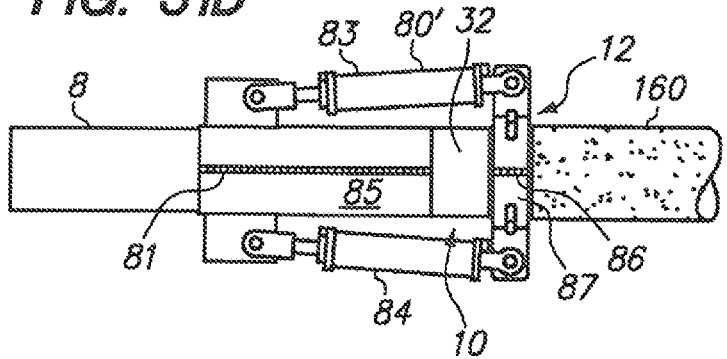
FIG. 31D is the installation tool of FIGS. 31A-31C after actuation of the first and second cylinders to receive the bore of the sleeve onto the set of fingers of the base to form a stop collar.

FIG. 31B illustrates the positioning of the fingers 16A between the sleeve 32 and the base 12. FIG. 31C illustrates the positioning of an end of the fingers 16A (not shown in FIG. 31C—see FIG. 31E) within an enlarged bore portion (see element number 14A of FIG. 10) of the base 12. FIG. 31D illustrates the installation tool 80' after the cylinders 83 and 84 are actuated from the elongated configuration illustrated in FIG. 31A-31C to the retracted position illustrated in FIG. 31D.

Figure 31E:
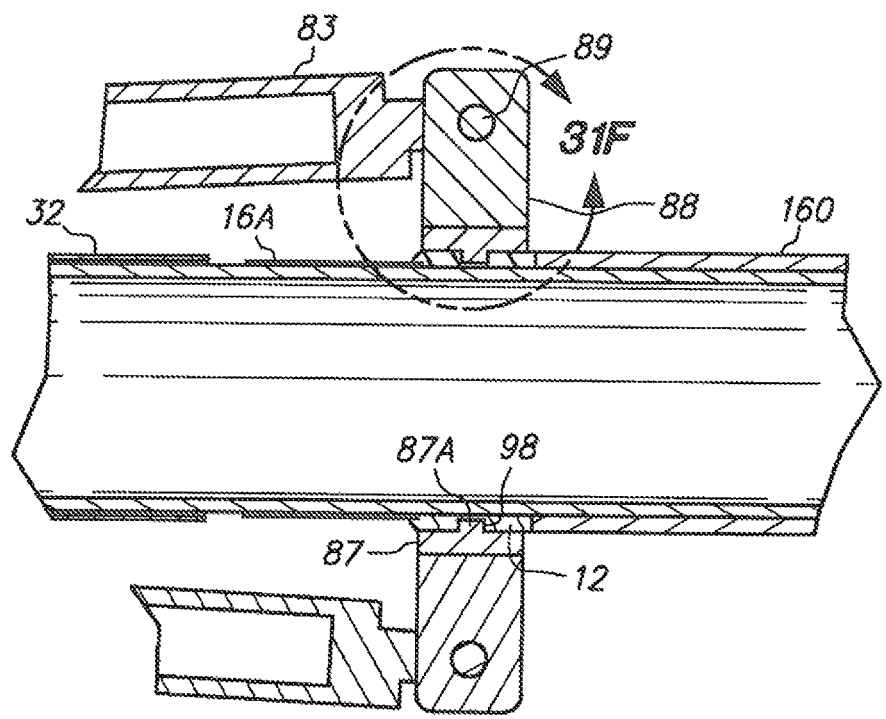
FIG. 31E is an enlarged view of a part of the installation tool of FIG. 31C.
Figure 31F:
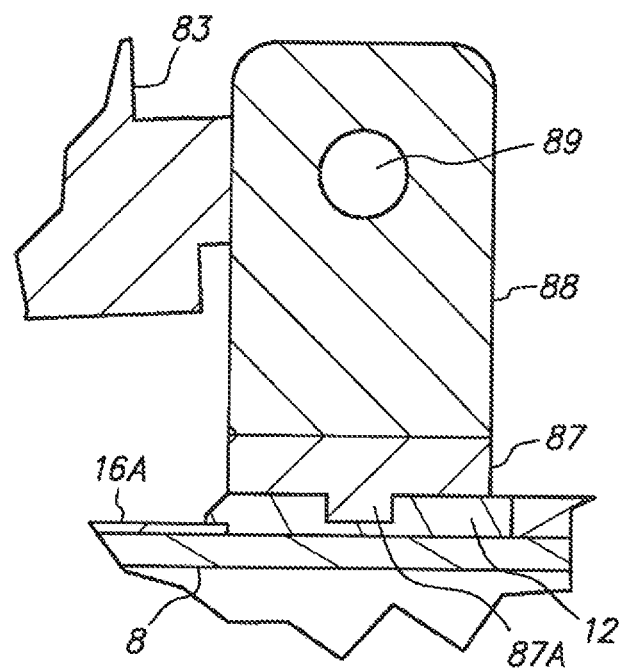
FIG. 31F is an enlarged view of part of FIG. 31E.

FIG. 31E is an enlarged view of a part of the installation tool 80 of FIG. 31C illustrating the coupling between the second sleeve 87 and the base 12. The second sleeve 87 comprises a lug 87A, e.g., an inwardly disposed protrusion, received into the recess 98 in the base 12. The depicted cylinder 83 is coupled to an ear 88 at a pivot axle 89, as can be seen in FIG. 31F, an enlarged view of the coupling between the cylinder 83 and the base 12.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

U.S. Provisional Application No. 61/287,665 filed on Dec. 17, 2009, U.S. Provisional Application No. 61/237,202 filed on Aug. 26, 2009, U.S. Provisional Application No. 61/221,716 filed on Jun. 30, 2009, and U.S. Provisional Application No. 61/167,482 filed on Apr. 7, 2009 are incorporated herein by reference.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. An installation tool to secure an interference-fit stop collar on a tubular, comprising:
    a first body having a bore to receive the tubular;
    a second body having a bore to receive the tubular; and
    a drive member coupled with the first body and the second body, wherein actuation of the drive member from an elongate configuration to a retracted configuration adducts a sleeve engaged by an engaging surface of the first body toward a base having fingers extending axially therefrom, the base being engaged by an engaging surface of the second body.

2. The installation tool of claim 1, wherein the engaging surface of the first body comprises an interior lug for being received into a recess formed in the base.

3. The installation tool of claim 1, wherein the drive member is a fluidic cylinder.

4. The installation tool of claim 1, wherein the drive member is a screw jack.

5. The installation tool of claim 1, wherein at least one of the first body and the second body comprise a hinge to facilitate receiving the tubular prior to actuation of the drive member and removal of the tubular after actuation of the drive member.

6. An installation tool for securing a collar on a tubular, comprising:
    a first body configured to be coupled with the tubular, wherein the first body defines a first engaging surface configured to engage a first component of the collar, wherein the first component comprises a base and fingers extending axially from the base;
    a second body configured to be received around the tubular and to slide axially with respect thereto, wherein the second body defines a second engaging surface configured to engage a second component of the collar; and a drive member extending between the first and second bodies, wherein the drive member is configured to adduct the first and second bodies together such that the first and second components of the collar engage one another.

7. The installation tool of claim 6, wherein the first body is configured to be received around the tubular.

8. The installation tool of claim 6, wherein the first body is configured to be received around the first component, the first component being received around the tubular and at least partially radially between the first body and the tubular.

9. The installation tool of claim 8, wherein the first engaging surface comprises a lug configured to be received into a recess defined in the first component.

10. The installation tool of claim 6, further comprising a clamp configured to be received around the tubular to prevent the first component from translating axially with respect to the tubular.

11. The installation tool of claim 10, wherein the clamp is configured to be received around the first component, wherein the first component is received around the tubular at least partially radially between the tubular and the clamp.

12. The installation tool of claim 6, wherein the second engaging surface comprises an axial face of the second body.

13. The installation tool of claim 6, wherein the second component comprises a sleeve of the collar, wherein the sleeve is configured to slide over at least a portion of the fingers so as to form an interference fit therewith when the first and second bodies are adducted.

14. The installation tool of claim 6, wherein the first body comprises two or more arcuate segments and one or more hinges configured to pivotally couple the two or more arcuate segments together.

15. The installation tool of claim 1, wherein the sleeve is configured to slide over at least a portion of the fingers so as to form an interference fit therewith when the first and second bodies are adducted.

16. An apparatus, comprising:
a base having a plurality of axially extending fingers, the base being configured to be disposed around a tubular;
a sleeve configured to be disposed around the tubular; and
an installation tool, comprising:
a first body configured to be positioned around the tubular and to engage an axial side of the sleeve;
a second body configured to be positioned around the tubular and to engage a first axial side of the base, wherein the plurality of fingers extend from a second axial side of the base; and
a drive member configured to reduce an axial distance between at least a portion of the first body and at least a portion of the second body, so as to position the sleeve over at least a portion of the plurality of fingers, such that the plurality of fingers are at least partially radially between the tubular and the sleeve.

17. The apparatus of claim 16, wherein the first body is configured to be positioned entirely around the tubular.

18. The apparatus of claim 17, wherein the first body comprises a hinge and two or more segments connected together by the hinge, and wherein the first body is configured to be received around the tubular laterally by pivoting the two or more segments relative to one another.

19. The apparatus of claim 16, wherein the drive member extends at least partially between the first body and the second body.

20. The apparatus of claim 16, wherein the drive member is configured to move the first body in an axial direction relative to the tubular and relative to the second body, so as to slide the sleeve axially toward the base.

21. The apparatus of claim 16, wherein the plurality of fingers are separated circumferentially apart by a plurality of slots, at least one of the plurality of slots not extending axially across an entirety of the base.

22. The apparatus of claim 16, wherein, when the sleeve is received onto the fingers, the sleeve forms an interference fit with the plurality of fingers and the tubular.

23. The apparatus of claim 16, wherein the drive member comprises one or more hydraulic cylinders.

\* \* \* \* \*